(12) United States Patent
Woo et al.

(10) Patent No.: US 8,379,013 B2
(45) Date of Patent: Feb. 19, 2013

(54) METHOD, MEDIUM AND APPARATUS RENDERING 3D GRAPHIC DATA

(75) Inventors: Sang-oak Woo, Anyang-si (KR); Kee-chang Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 910 days.

(21) Appl. No.: 11/892,427

(22) Filed: Aug. 22, 2007

(65) Prior Publication Data

US 2008/0074415 A1  Mar. 27, 2008

(30) Foreign Application Priority Data

Aug. 24, 2006 (KR) .................. 10-2006-0080719

(51) Int. Cl.
*G06T 15/00* (2011.01)
(52) U.S. Cl. .................... 345/419; 345/428; 463/32
(58) Field of Classification Search .................. None
See application file for complete search history.

(56) References Cited

U.S. PATENT DOCUMENTS

| | | | | |
|---|---|---|---|---|
| 5,530,477 A | | 6/1996 | Coelho | |
| 5,805,171 A | * | 9/1998 | St. Clair et al. | 345/619 |
| 6,072,498 A | * | 6/2000 | Brittain et al. | 345/428 |
| 6,160,559 A | * | 12/2000 | Omtzigt | 345/503 |
| 6,313,838 B1 | * | 11/2001 | Deering | 345/420 |
| 7,268,785 B1 | * | 9/2007 | Glanville et al. | 345/506 |
| 7,418,606 B2 | * | 8/2008 | Holmer | 713/320 |
| 2002/0080143 A1 | * | 6/2002 | Morgan et al. | 345/581 |
| 2003/0128198 A1 | * | 7/2003 | Mizuyabu et al. | 345/204 |
| 2003/0210271 A1 | * | 11/2003 | King | 345/771 |
| 2005/0179700 A1 | * | 8/2005 | Seiler et al. | 345/614 |
| 2007/0211055 A1 | * | 9/2007 | Stein et al. | 345/428 |

FOREIGN PATENT DOCUMENTS

| | | |
|---|---|---|
| JP | 8-9347 | 1/1996 |
| JP | 2003-162734 | 6/2003 |
| KR | 10-2005-0061249 | 6/2005 |
| KR | 10-0668326 | 1/2007 |

OTHER PUBLICATIONS

McGuire, Thomas. "Max Payne Tweak Guide" [online], Aug. 2001 [retrieved Jun. 11, 2012]. Retrieved from the Internet: <URL: http://www.techspot.com/tweaks/maxpayne/print.shtml>.*

* cited by examiner

*Primary Examiner* — Jeffrey Chow
*Assistant Examiner* — Andrew G Yang
(74) *Attorney, Agent, or Firm* — Staas & Halsey LLP

(57) ABSTRACT

Provided are a method and apparatus rendering three-dimensional (3D) graphic data. The method includes eliminating at least one of a plurality of processes for rendering the three-dimensional (3D) graphic data in consideration of a rendering environment of the 3D graphic data and a state of power of a system rendering the 3D graphic data, generating a rendering function which performs the remaining processes after the at least one process is eliminated and rendering the 3D graphic data using the generated rendering function.

19 Claims, 28 Drawing Sheets
(7 of 28 Drawing Sheet(s) Filed in Color)

FIG. 5

| RENDERING OPTION | TEST FILES | | | | | | | |
|---|---|---|---|---|---|---|---|---|
| | Test 1 | Test 2 | Test 3 | Test 4 | Test 5 | Test 6 | Test 7 | Test 8 |
| A | 3.35 | 2.56 | 2.11 | 11.45 | 12.69 | 8.60 | 13.04 | 11.33 |
| B | 3.270 | 2.490 | 2.070 | 10.230 | 10.950 | 7.590 | 8.560 | 9.460 |
| C | 2.28 | 1.73 | 1.56 | 2.70 | 3.73 | 2.55 | 2.19 | 2.25 |
| D | 2.13 | 1.62 | 1.49 | 2.37 | 3.19 | 2.12 | 1.69 | 1.97 |

A: texture filtering off, perspective correction off
B: texture filtering on, perspective correction off
C: texture filtering off, perspective correction on
D: texture filtering on, perspective correction on

FIG. 6B

| RENDERING OPTION | MINIMUM REMAINING POWER THAT TURNS OFF CORRESPONDING RENDERING OPTION |
|---|---|
| Texture filtering | POWER_A |
| Texture mipmap | POWER_B |
| anti-aliasing | POWER_C |
| specular | POWER_D |
| dithering | POWER_E |
| perspective correction | POWER_F |

FIG. 7B

| RENDERING OPTION | MINIMUM DISTANCE THAT TURNS OFF CORRESPONDING RENDERING OPTION |
|---|---|
| Texture filtering | DISTANCE_A |
| Texture mipmap | DISTANCE_B |
| anti-aliasing | DISTANCE_C |
| specular | DISTANCE_D |
| dithering | DISTANCE_E |
| perspective correction | DISTANCE_F |

FIG. 8B

| RENDERING OPTION | VALUE OF f (d, s) THAT TURNS OFF CORRESPONDING RENDERING OPTION |
|---|---|
| Texture filtering | AREA_A |
| Texture mipmap | AREA_B |
| anti-aliasing | AREA_C |
| specular | AREA_D |
| dithering | AREA_E |
| perspective correction | AREA_F |

FIG. 9B

| RENDERING OPTION | VALUE OF f (d, s) THAT TURNS OFF CORRESPONDING RENDERING OPTION |
|---|---|
| Texture filtering | Value_A |
| Texture mipmap | Value_B |
| anti-aliasing | Value_C |
| specular | Value_D |
| dithering | Value_E |
| perspective correction | Value_F |

FIG. 14

| IDENTIFIER | BRANCHING BLOCK |
|---|---|
| B1 | IS VERTEX FORMAT XYZRHW AND CLIPPING? |
| B2 | IS VERTEX FORMAT NON-CLIPPING OR VERTEX PROCESSING? |
| B3 | IS VERTEX FORMAT CLIPPING? |
| B4 | IS VERTEX FORMAT CAMERAVERTEX? |
| B5 | IS VERTEX FORMAT CAMERANORMAL? |
| B6 | DOES VERTEX FORMAT INCLUDE NORMAL? |
| B7 | WILL NORMALIZATION BE PERFORMED? |
| B8 | IS VERTEXT FORMAT LIGHTING? |
| B9 | IS VERTEX FORMAT DONOTCOPYDATA? |
| B10 | IS VERTEX FORMAT FOG? |

FIG. 15

| IDENTIFIER | BRANCHING BLOCK |
|---|---|
| C1 | CODE CONVERTING VERTEX FROM SCREEN COORDINATE SYSTEM TO CAMERA COORDINATE SYSTEM FOR CLIPPING |
| C2 | CODE GENERATING CLIP CODE |
| C3 | CODE COPYING DIFFUSE AND SPECULAR DATA |
| C4 | CODE COPYING TEXTURE COORDINATES |
| C5 | CODE CONVERTING INPUT VERTEXT INTO CAMERA COORDINATE SYSTEM |
| C6 | CODE STORING z VALUE TO CALCULATE FOG |
| C7 | CODE PERFORMING PROJECTION |
| C8 | CODE APPLYING INFORMATION REGARDING |
| C9 | CODE CALCULATING CLIP CODE |
| C10 | CODE STORING CLIP CODE |
| C11 | CODE CONVERTING INPUT VERTEX INTO CAMERA COORDINATE SYSTEM |
| C12 | CODE CONVERTING INPUT NORMAL INTO CAMERA COORDINATE SYSTEM |
| C13 | CODE PERFORMING NORMALIZATION OF NORMAL |
| C14 | CODE INITIALIZING NORMAL |
| C15 | CODE COPYING DIFFUSE |
| C16 | CODE COPYING SPECULAR |
| C17 | CODE CALCULATING BASIC AMOUNT |
| C18 | CODE CALCULATING BASIC SPECULAR |
| C19 | CODE CALCULATING EFFECT ACCORDING TO TYPE OF LIGHT SOURCE |
| C20 | CODE UPDATING DIFFUSE VALUE |
| C21 | CODE CALCULATING FOG VALUE USING FOG EQUATION |
| C22 | CODE COPYING TEXTURE COORDINATES OR GENERATING TEXTURE |

FIG. 18

| IDENTIFIER | BRANCHING BLOCK |
|---|---|
| B11 | WILL Z TEST BE PERFORMED? |
| B12 | WILL STENCIL TEST BE PERFORMED? |
| B13 | WILL CURRENT PIXEL BE DRAWN BASED ON RESULTS OF Z TEST AND STENCIL TEST? |
| B14 | IS MATERIAL INFORMATION AVAILABLE? |
| B15 | WILL PERSPECTIVE CORRECTION BE PERFORMED? |
| B16 | HAS ALL TEXTURE PROCESSING BEEN COMPLETED? |
| B17 | WILL ALPHA TESTING AND BLENDING BE PERFORMED? |
| B18 | WILL FOG CALCULATION BE PERFORMED? |

FIG. 19

| IDENTIFIER | CODE BLOCK |
|---|---|
| C23 | CODE PERFORMING Z TEST |
| C24 | CODE PERFORMING STENCIL TEST |
| C25 | CODE PERFORMING BOTH PERSPECTIVE CORRECTION AND TEXTURE PROCESSING |
| C26 | CODE PERFORMING TEXTURE PROCESSING WITHOUT PERFORMING PERSPECTIVE CORRECTION |
| C27 | CODE PERFORMING ALPHA TESTING/BLENDING |
| C28 | CODE CALCULATING FOG |
| C29 | CODE PERFORMING SPECULAR AND Z WRITING |
| C30 | CODE PERFORMING CALCULATED COLOR WRITING |

RENDERING FUNCTION 1

RENDERING FUNCTION 2

METHOD, MEDIUM AND APPARATUS RENDERING 3D GRAPHIC DATA

CROSS-REFERENCE TO RELATED APPLICATIONS

This application claims the priority of Korean Patent Application No. 10-2006-0080719 filed on Aug. 24, 2006, in the Korean Intellectual Property Office, the disclosure of which is incorporated herein in its entirety by reference.

BACKGROUND

1. Field

One or more embodiments of the present invention relate to a method and apparatus for rendering three-dimensional (3D) graphic data, and a computer-readable recording medium on which a program for executing the method is recorded.

2. Description of the Related Art

Description techniques of three-dimensional (3D) graphic data for displaying a 3D object on a two-dimensional (2D) screen include virtual reality modeling language (VRML), which is a standard technology. 3D graphic data includes geometric information of objects in a 3D space, material information of the objects, and information regarding changes in the geometric and material information over time. For example, geometric information includes information regarding positions of 3D vertexes that form an object and connection information of the 3D vertexes. The material information includes information regarding the texture, transparency and color of the object, the light reflectivity of the surface of the object, and the position and characteristics of a light source.

In order to display a 3D object on a screen using such 3D graphic data, an apparatus is required for parsing read 3D graphic data and converting the parsed 3D graphic data. This apparatus is generally called a 3D graphics rendering engine. The 3D graphics rendering engine includes a parser and a renderer. The parser reads 3D graphic data and parses the meaning of the read 3D graphic data. In other words, the parser identifies, interprets and determines whether the read 3D graphic data indicates geometric information of objects, material information of the objects, or information regarding the superior-subordinate relationship between the objects represented in a scene graph structure. The renderer renders the scene graph parsed by the parser and displays the rendered scene graph on the screen.

Conventional rendering engines render 3D graphic data using a fixed rendering function, that is, software codes to perform a series of processes which include a predetermined process for rendering 3D graphic data, such as texture filtering or anti-aliasing. However, since the conventional rendering engines render all graphic data in the same way using the fixed rendering function and without considering characteristics of the 3D graphic data, they include many codes which perform unnecessary functions. Accordingly, the size of the rendering function becomes unnecessarily large.

In addition, a rendering process for 3D graphic data is a process of calculating depth information as well as color information of each pixel on the screen. Therefore, if the size of the rendering function increases, the amount of required calculation increases, thereby lowering the rendering speed.

In order to solve such a problem, the present applicant has invented a rendering method and apparatus which can prevent the deterioration of image quality and enhance the rendering speed by analyzing characteristics of 3D graphic data and rendering the 3D graphic data using a flexible rendering function generated in consideration of the analyzed characteristics of the 3D graphic data. As an example, a general rendering method and device are discussed in Korean Patent Application No. 10-2005-0009107. There, unnecessary codes are excluded from a rendering operation based on the characteristics of 3D graphic data. Therefore, the amount of calculation required is reduced, which, in turn, increases the rendering speed. However, while such techniques consider the characteristics of data to be rendered, they fail to consider the state of power of a system performing the rendering process.

A function for reproducing 3D graphic data has recently been added to mobile devices such as mobile game players or navigators for vehicles. Since mobile devices run on limited power, power consumed in the rendering process must be reduced in order for the mobile devices to render 3D graphic data, which requires a considerable amount of calculation.

SUMMARY

One or more embodiments of the present invention provide a rendering method and apparatus which can minimize the deterioration of image quality while reducing power consumed in a rendering process according to a power state of the rendering apparatus by generating a rendering function which performs remaining processes after at least one of a plurality of processes for rendering three-dimensional (3D) graphic data is eliminated in consideration of a rendering environment, such as a power state of the rendering apparatus, the distance between an object represented by the 3D graphic data and a camera, and an area occupied by the object on a screen, and rendering the 3D graphic data using the generated rendering function. A computer-readable recording medium, on which a program for executing the rendering method is recorded, is also provided.

Additional aspects and/or advantages will be set forth in part in the description which follows and, in part, will be apparent from the description, or may be learned by practice of the invention.

To achieve at least the above and/or other aspects and advantages, embodiments of the present invention include a method of rendering three-dimensional (3D) graphic data including, eliminating at least one of a plurality of processes for rendering the three-dimensional (3D) graphic data in consideration of a rendering environment of the 3D graphic data and a state of power of a system rendering the 3D graphic data, generating a rendering function which performs the remaining processes after the at least one process is eliminated and rendering the 3D graphic data using the generated rendering function.

The rendering environment may include a current state of power of a system rendering the 3D graphic data or at least one of a current distance between an object, which is represented by the 3D graphic data, and a camera and a current area occupied by the object on a screen.

In the rendering of the 3D graphic data, no more than a predetermined number of frames of the 3D graphic data may be rendered over a predetermined period of time.

To achieve at least the above and/or other aspects and advantages, embodiments of the present invention include an apparatus rendering three-dimensional (3D) graphic data including, a setting unit eliminating at least one of a plurality of processes for rendering 3D graphic data in consideration of a rendering environment of the 3D graphic data and a state of power of the apparatus rendering the 3D graphic data, a function generation unit generating a rendering function, which performs the remaining processes after the at least one process is eliminated and a rendering unit rendering the 3D graphic data using the generated rendering function.

To achieve at least the above and/or other aspects and advantages, embodiments of the present invention include at least one medium including computer readable code to control at least one processing element to implement methods of rendering three-dimensional (3D) graphic data.

BRIEF DESCRIPTION OF THE DRAWINGS

The patent or application file contains at least one drawing executed in color. Copies of this patent or patent application publication with color drawings will be provided by the Office upon request and payment of the necessary fee. These and/or other aspects and advantages will become apparent and more readily appreciated from the following description of embodiments, taken in conjunction with the accompanying drawings of which:

FIG. 5 is a conceptual diagram for explaining a reduction in power consumed during a rendering process when performed, according to an embodiment of the present invention;

FIG. 6B is a conceptual diagram for explaining the embodiment illustrated in FIG. 6A;

FIG. 7B is a conceptual diagram for explaining the embodiment illustrated in FIG. 7A;

FIG. 8B is a conceptual diagram for explaining the embodiment illustrated in FIG. 8A;

FIG. 9B is a conceptual diagram for explaining the embodiment illustrated in FIG. 9A;

FIG. 14 is a table showing the content of the branching blocks included in the flowchart of FIG. 13;

FIG. 15 is a table showing the content of the code blocks included in the flowchart of FIG. 13;

FIG. 18 illustrates the content of the branching blocks included in the flowchart of FIG. 17;

FIG. 19 illustrates the content of the code blocks included in the flowchart of FIG. 17.

DETAILED DESCRIPTION OF EMBODIMENTS

Figure 1A:
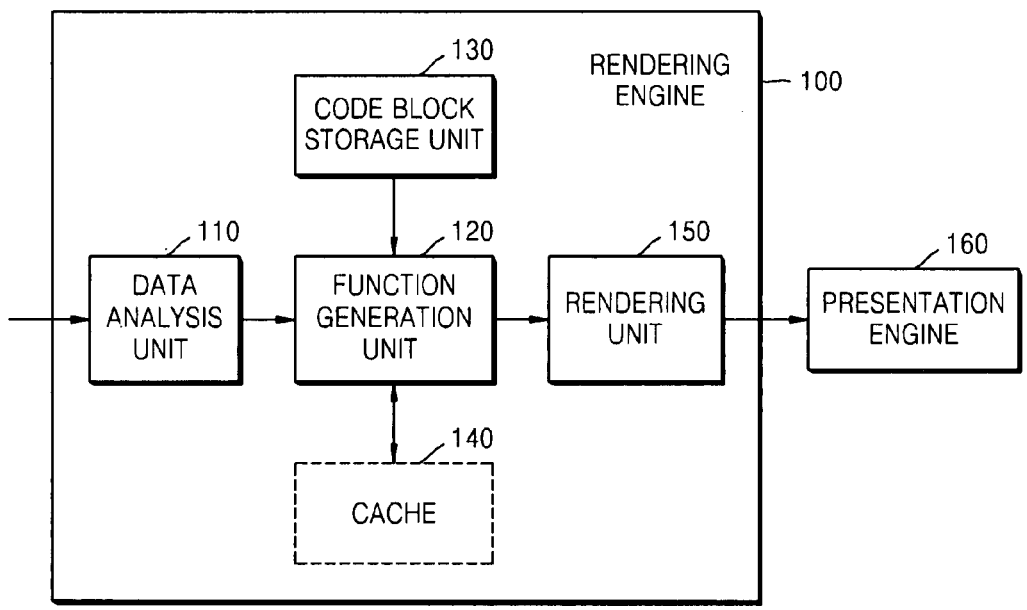
FIG. 1A is a schematic block diagram of an apparatus for rendering three-dimensional (3D) graphic data using code blocks, according to the conventional art.

Reference will now be made in detail to embodiments, examples of which are illustrated in the accompanying drawings, wherein like reference numerals refer to the like elements throughout. Embodiments are described below to explain the present invention by referring to the figures.

A method and apparatus rendering three-dimensional (3D) graphic data using code blocks to which the present invention is applied will now be described with reference to FIGS. 1A and 2.

FIG. 1A is a schematic block diagram of an apparatus for rendering 3D graphic data using code blocks. The apparatus may include, for example, a rendering engine 100 and a presentation engine 160.

The rendering engine 100 may analyze characteristics of input 3D graphic data, generate a rendering function using a code block corresponding to the analysis result, and render the input 3D graphic data based on the generated rendering function. Then, the rendering engine 100 may provide the rendered 3D graphic data to the presentation engine 160.

In this case, the rendering function may denote a group of codes that perform predetermined processing processes for rendering 3D graphic data, such as a vertex processing process including a model transform, a view transform, lighting, shading, projection, clipping and screen mapping, and a pixel processing process including texture filtering, texture mipmaping, anti-aliasing, specular, dithering and perspective correction.

The presentation engine 160 may receive the rendered 3D graphic data from the rendering engine 100 and output the received 3D graphic data to a display device.

The rendering engine 100 illustrated in FIG. 1A may include, for example, a data analysis unit 110, a function generation unit 120, a code block storage unit 130, a cache 140, and a rendering unit 150.

The data analysis unit 110 may receive 3D graphic data and analyze the characteristics of the input 3D graphic data. The 3D graphic data input to the data analysis unit 110 may broadly include, for example, information regarding characteristics of a 3D vertex, characteristics of a primitive composed of a group of 3D vertexes, and a rendering state related to the vertex processing process and the pixel processing process.

The vertex processing process generally denotes a process of converting 3D information into 2D information based on 3D graphic data to be rendered. The pixel processing process generally denotes a process of processing the 2D information obtained after the vertex processing process. For example, in the pixel processing process, the two-dimensional space inside a triangle may be filled. Information processed in the vertex processing process and the pixel processing process may be different. However, both processes may be a series of processing processes for rendering 3D graphic data.

Hereinafter, a description will be made regarding such information included in the 3D graphic data input to the data analysis unit 110.

First of all, information about the characteristics of 3D vertexes may include, for example, basic position coordinates of the 3D vertex, the position of the 3D vertex with respect to the changed position coordinates of the 3D vertex, a normal, a diffuse color of the 3D vertex (i.e. color reflected from a vertex), a specular color (e.g., a shiny color used to give an object a shiny appearance, and texture coordinates. There may be one or more texture coordinates and even four through eight textures coordinates depending on hardware.

Next, information about the characteristics of a primitive include, for example, a group of vertexes, a group of lines, a group of triangles, the number of vertexes, the presence of an index and the index. The group of lines may include a line list and a line strip. The line list may indicate that lines exist separately. For example, if positions are A, B, C and D, there may be two lines, i.e. A-B and C-D. The line strip may indicate that lines overlap. For example, if positions are A, B, C and D, there may be three lines, i.e. A-B, B-C and C-D. The group of triangles may include a triangle list, a triangle strip, and a triangle fan. The triangle list may indicate that triangles exist separately. For example, if positions are A, B, C, D, E and F, there may be two triangles (ABC) and (DEF). The triangle strip may indicate that triangles overlap. For example, if positions are A, B, C, D, E and F, there may be four triangles (ABC), (BCD), (CDE) and (DEF). The triangle fan may indicate that triangles overlap around their centers. For example, if positions are A, B, C, D, E and F, there may be four triangles (ABC), (ACD), (ADE) and (AEF). The index may indicate that the order of the vertexes is determined using an index instead of an input order of the vertexes if there exist a group of vertexes constituting a triangle.

Next, the rendering state information related to the vertex processing may include, for example, whether to clip a portion of a primitive, such as a vertex, line or triangle, which is located outside a screen, whether to perform only vertex processing, whether to transform into a camera coordinate system, whether to perform transformation using a camera normal, whether to give a light source, the type of the light source, whether to provide a fog effect, a final fog value, and a type of fogging effect.

The rendering state information related to the pixel processing may include, for example, whether to perform a Z testing to cause a vertex near to a camera to be seen and a vertex far from the camera not to be seen, and a Z testing method. The rendering state information related to the pixel processing may also include, for example, whether to perform Z writing to write Z value (depth value) to a Z buffer (to which only a depth value of each vertex without a color value of each vertex is written) after Z testing, whether to use a stencil buffer for expressing shadows, the type of stencil testing, whether to perform texture perspective correction, which is a technology for preventing texture information from changing according to a distance or minimizing a change in texture information. Furthermore, the rendering state information related to the pixel processing may include, for example, whether to use specular, a specular value, whether to use a fog effect, a value and type of the fog effect, whether to perform alpha blending, the type of alpha blending, and whether to perform dithering, which is a technique for properly simulating unavailable colors of a picture using a finite number of colors.

The characteristics described above are mere examples. Therefore, various other characteristics which may be easily conceived by those of ordinary skill in the art may be added, while still remaining within the scope of the present invention.

The code block storage unit 130 may store code blocks, each composed of codes performing predetermined functions. An example of the code blocks is illustrated in FIGS. 15 and 19. Specifically, FIG. 15 illustrates code blocks for vertex processing, and FIG. 19 illustrates code blocks for pixel processing. Here, each code block is a bundle of commands performing predetermined functions. Since the apparatus illustrated in FIG. 1A extracts code blocks to be processed according to characteristics of 3D graphic data to be rendered and forms a rendering function, the apparatus can exclude unnecessary code blocks from the rendering function. In addition, the apparatus may include code blocks to be processed according to the characteristics of the 3D graphic data in the rendering function. Therefore, the apparatus can exclude branching blocks or conditional statements from the rendering function.

The function generation unit 120 generally refers to information regarding characteristics of the 3D graphic data analyzed by the data analysis unit 110, reads code blocks corresponding to the information from the code block storage unit 130, combines the read code blocks, and generates a rendering function according to the characteristics of the input 3D graphic data. The generated rendering function may be provided to the rendering unit 150.

The rendering unit 150 may render the input 3D graphic data using the generated rendering function and transmit the rendered 3D graphic data to the presentation engine 160. The presentation engine 160 may transmit the rendered 3D graphic data to the display device, which then displays the received 3D graphic data.

Characteristically, 3D graphic data may include one or more objects having similar characteristics. Therefore, the generated rendering function may be stored so that it can be used later again. The cache 140 may store the generated rendering function.

Accordingly, the function generation unit 120 may not only output the generated rendering function to the rendering unit 150 but may also transmit the generated rendering function to the cache 140 so that the cache 140 can store the generated rendering function. In a next rendering process, the function generation unit 120 may first search for a rendering function appropriate for characteristics of input 3D graphic data in the cache 140. If the rendering function appropriate for the characteristics of the input 3D graphic data is found, instead of reading code blocks corresponding to the characteristics of the input 3D graphic data from the code block storage unit 130 and combining the read code blocks in order to generate a rendering function, the function generation unit 120 may call the rendering function found in the cache 140 and provide the called rendering function to the rendering unit 150 so that the rendering unit 150 can render the input 3D graphic data using the called rendering function. Since the cache 140 is selectively used, it is illustrated in a dotted line in FIG. 1A.

Figure 2:
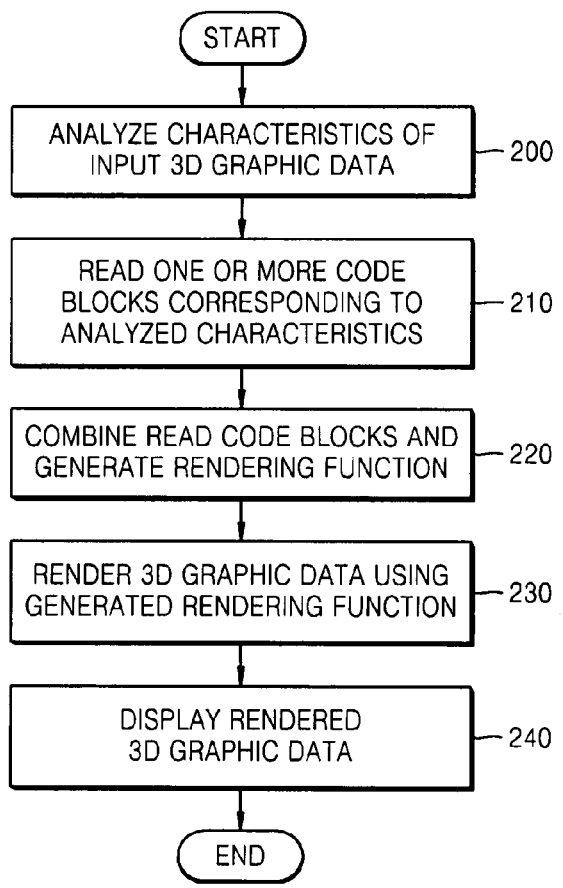
FIG. 2 is a flowchart illustrating the operation of the apparatus illustrated in FIG. 1A, according to an embodiment of the apparatus illustrated in FIG. 1A.

FIG. 2 is a flowchart illustrating a rendering process performed by the rendering engine 100 of FIG. 1A.

In operation 200, the data analysis unit 110 may analyze characteristics of input 3D graphic data and provide information regarding the analyzed characteristics to the function generation unit 120.

In operation 210, the function generation unit 120 may read at least one code block corresponding to the information regarding the analyzed characteristics from the code block storage unit 130.

In operation 220, the function generation unit 120 may generate a rendering function by combining the read code blocks and provide the generated rendering function to the rendering unit 150.

In operation 230, the rendering unit 150 may render the input 3D graphic data using the generated rendering function and transmit the rendered 3D graphic data to the presentation engine 160.

In operation 240, the presentation engine 160 may display the received and rendered 3D graphic data.

Figure 1B:
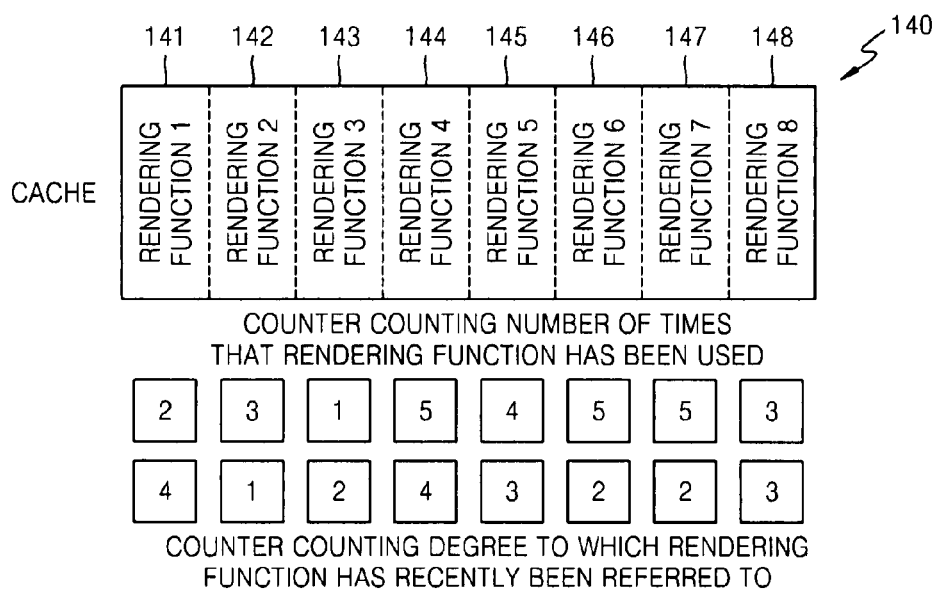
FIG. 1B illustrates an example of a cache illustrated in FIG. 1A.

FIG. 1B illustrates a specific example of the cache 140 of FIG. 1A. Referring to FIG. 1B, the cache 140 may include, for example, 8 blocks and store 8 rendering functions. For example, a first block 141 of the cache 140 stores a rendering function 1, a second block 142 of the cache 140 stores a rendering function 2, and a third block 143 of the cache 140 stores a rendering function 3. Likewise, a fourth block 144 of the cache 140 stores a rendering function 4, a fifth block 145 stores a rendering function 5, a sixth block 146 stores a rendering function 6, a seventh block 147 stores a rendering function 7, and an eighth block 148 stores a rendering function 8.

Two counters may be implemented for each block of the cache 140. One hereinafter referred to as a first counter of the two counters may indicate the total number of times that a corresponding rendering function has been used, and the other one hereinafter referred to as a second counter may indicate the degree the corresponding rendering function has recently been referred to.

The first counter is initialized to zero when a rendering function is stored in the cache 140 for the first time. Then, whenever the rendering function stored in a corresponding block is used, the first counter is increased by 1. Referring to FIG. 1B, the first counter may indicate that rendering function 1 has been used twice and rendering function 2 has been used three times. The second counter may indicate how many times a corresponding function has recently been referred to. The second counter may also be increased by 1 whenever the corresponding rendering function is referred to. It may be desirable to update the second counter at predetermined time intervals in order to indicate the degree the corresponding rendering function has recently been referred to.

These two counters are required to select a rendering function that is to be eliminated when any one of the rendering functions needs to be eliminated. In other words, if there is no available block to store a new rendering function because all blocks of the cache 140 are already occupied by respective rendering functions, one of the rendering blocks stored in the cache 140 should be eliminated in order to accommodate the new rendering function. In this case, it may be effective to eliminate a rendering function with low frequency of use or least recently referred to. Therefore, referring to FIG. 6, if a rendering function to be eliminated is selected using the first counter, since the first counter shows the lowest value for rendering function 3, rendering function 3 may be eliminated in order to be able to store the new rendering function in the third block 143. In addition, if a rendering function that is to be eliminated is selected using the second counter, since the second counter shows the lowest value for rendering function 2, rendering function 2 may be eliminated in order to be able to store the new rendering function in the second block 142. Alternatively, both the first and second counters may appropriately be used to select a rendering function that is to be eliminated. A method of selecting a rendering function that is to be eliminated may vary according to a cache policy. One method may include replacing a rendering function which has been used least recently.

Figure 13:
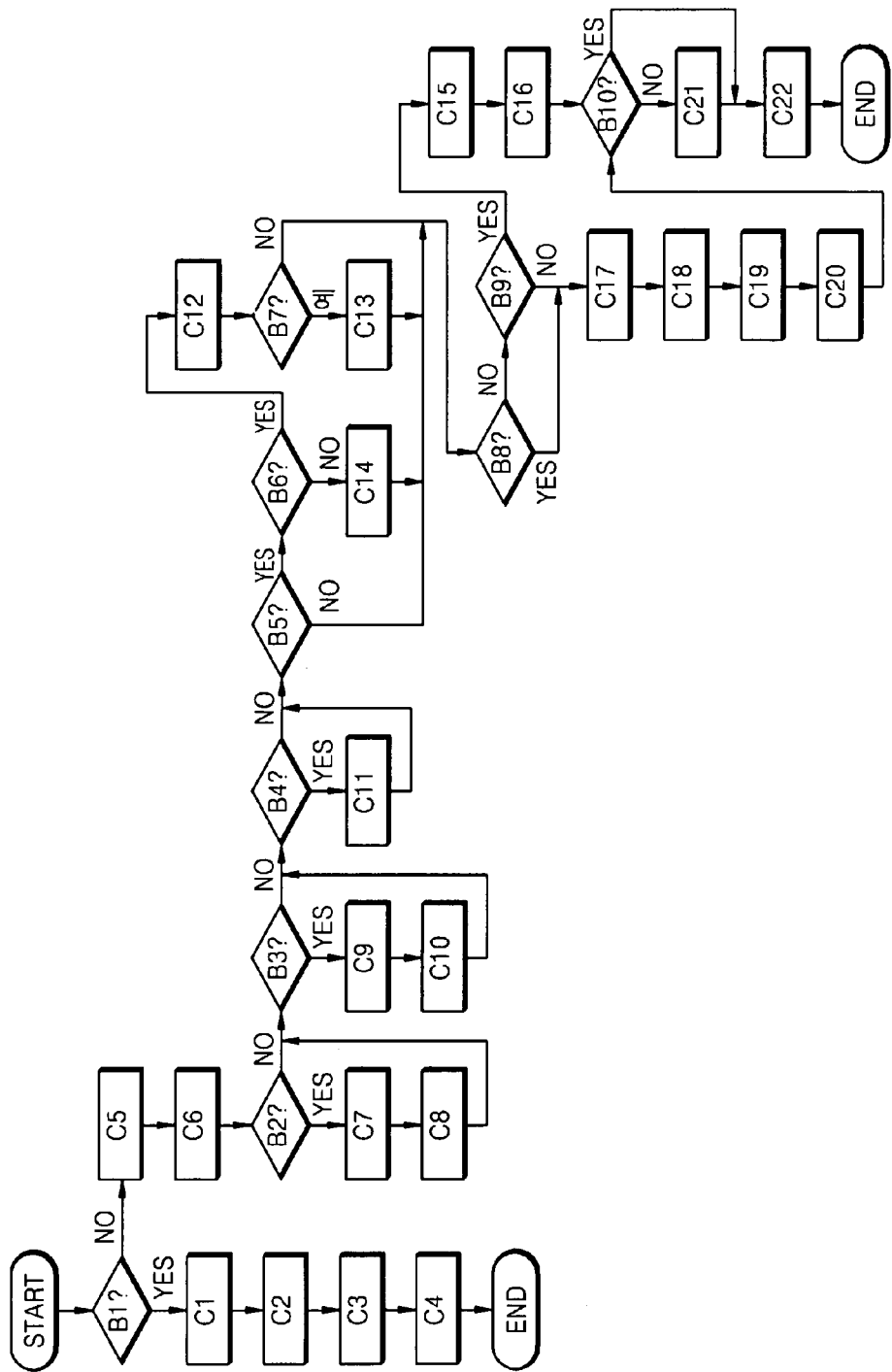
FIG. 13 is a flowchart having branching blocks and code blocks for vertex processing, according to an embodiment of the present invention.

A specific example of generating a rendering function using code blocks will now be described. FIG. 13 is a flowchart having branching blocks and code blocks for vertex processing, according to an embodiment of the present invention.

A branching block denotes a conditional statement or a branch statement which may analyze characteristics of 3D graphic data and determine whether to perform a code block based on the analyzed characteristics. A code block may denote a group of codes, each performing a predetermined function according to characteristics of 3D graphic data. In this rendering method of FIG. 13, characteristics of 3D graphic data may be analyzed, and a rendering function may be generated using code blocks corresponding to the analyzed characteristics. Here, an analysis of the characteristics of the 3D graphic data may be made during the determination process of branching blocks.

Referring to FIG. 13, an entire flowchart related to vertex processing may be as follows. After analyzing characteristics of 3D graphic data related to vertex processing, if a branching block B1 determines 'yes,' code blocks C1 through C4 are performed, and then vertex processing is terminated. If the branching block B1 determines 'no,' code blocks C5 and C6 are performed, and a branching block B2 makes a determination. If the branching block B2 determines 'yes,' code blocks C7 and C8 are performed. If 'no,' a branching block B3 makes a determination. If the branching block B3 determines 'yes,' code blocks C9 and C10 are performed. If 'no,' a branching block B4 makes a determination. If the branching block B4 determines 'yes,' a code block C11 is performed. If 'no,' a branching block B5 makes a determination. If the branching block B5 determines 'yes,' a branching block B6 makes a determination. If 'no,' a branching block B8 makes a determination. If the branching block B6 determines 'no,' a code block C14 is performed. If 'yes,' a code block C12 is performed, and a branching block B7 makes a determination. If the branching block B7 determines 'yes,' a code block C13 is performed. If 'no,' a branching block B8 makes a determination. If the branching block B8 determines 'yes,' code blocks C17 through C20 are performed. If 'no,' a branching block B9 makes a determination. If the branching block B9 determines 'no,' the code blocks C17 through C20 are performed. If 'yes,' code blocks C15 and C16 are performed, and a branching block B10 makes a determination. If the branching block B10 determines 'no,' code blocks C21 and C22 are performed and the vertex processing is terminated. If 'yes,' the code block C22 is performed and the vertex processing is terminated.

The code block storage unit 130 may store the code blocks C1 through C22 related to vertex processing as illustrated in FIG. 15.

The data analysis unit 110 may analyze characteristics of 3D graphic data that is to be rendered using branching blocks as illustrated in FIG. 14, read code blocks as illustrated in FIG. 15, which correspond to the analyzed characteristics, and generate a rendering function by combining the read code blocks.

The content of each branching block or code block is merely an example used for vertex processing. Since the specific meaning or content of each branching block or code block is outside the scope of the present invention, a detailed description thereof will be omitted.

Figure 16A:
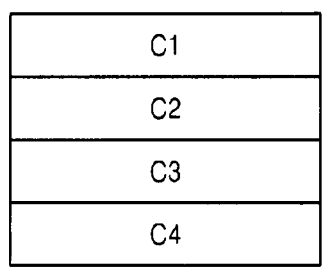
FIGS. 16A and 16B illustrate examples of rendering functions, which can be generated in the flowchart of FIG. 13.
Figure 16B:
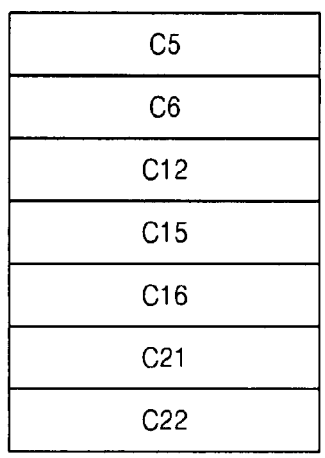

FIGS. 16A and 16B illustrate examples of rendering functions which can be generated in the flowchart of FIG. 13.

Referring to FIG. 16A, rendering function 1 may be composed of the code blocks C1 through C4.

Referring to FIGS. 13 and 14, as a result of the determination by the branching block B1, if a vertex format is XYZRHW and clipping, the code blocks C1 through C4 should be performed. Therefore, the function generation unit 120 may read the code blocks C1 through C4 from among the code blocks illustrated in FIG. 15, combine the read code blocks C1 through C4, and generate rendering function 1 composed of the code blocks C1 through C4.

Referring to FIG. 16B, rendering function 2 is composed of the code blocks C5, C6, C12, C15, C16, C21 and C22.

Referring to FIGS. 13 and 14, the data analysis unit 110 may analyze input 3D graphic data. The branching block B1, which determines whether the vertex format is XYZRHW and clipping, determines 'no,' and the branching block B2, which determines whether the vertex format is not clipping or is vertex processing, determines 'no.' Then, the branching block B3, which determines whether the vertex format is clipping, determines 'no,' the branching block B4, which determines whether the vertex format is CAMERAVERTEX, determines 'no,' and the branching block B5, which determines whether the vertex format is CAMERANORMAL, determines 'yes.' The branching block B6, which determines whether the vertex format includes normal, determines 'yes,' the branching block B7, which determines whether to perform normalization, determines 'no,' and the branching block B8, which determines whether the vertex format is lighting, determines 'no.' Also, the branching block B9, which determines whether the vertex format is DONOTCOPYDATA, determines 'yes,' and the branching block B10, which determines whether the vertex format is fog, determines 'no.' The data analysis unit 110 provides the function generation unit 120 with information regarding the determined characteristics of the 3D graphic data related with the vertex processing.

The function generation unit 120 may read the code blocks C5, C6, C12, C15, C16, C21 and C22 corresponding to the received information from the code blocks illustrated in FIG. 15, combine the read code blocks C5, C6, C12, C15, C16, C21 and C22, and generate a rendering function. The rendering function generated in this way may include code blocks that are to be processed according to the characteristics of the 3D graphic data and may not include branching blocks.

Figure 17:
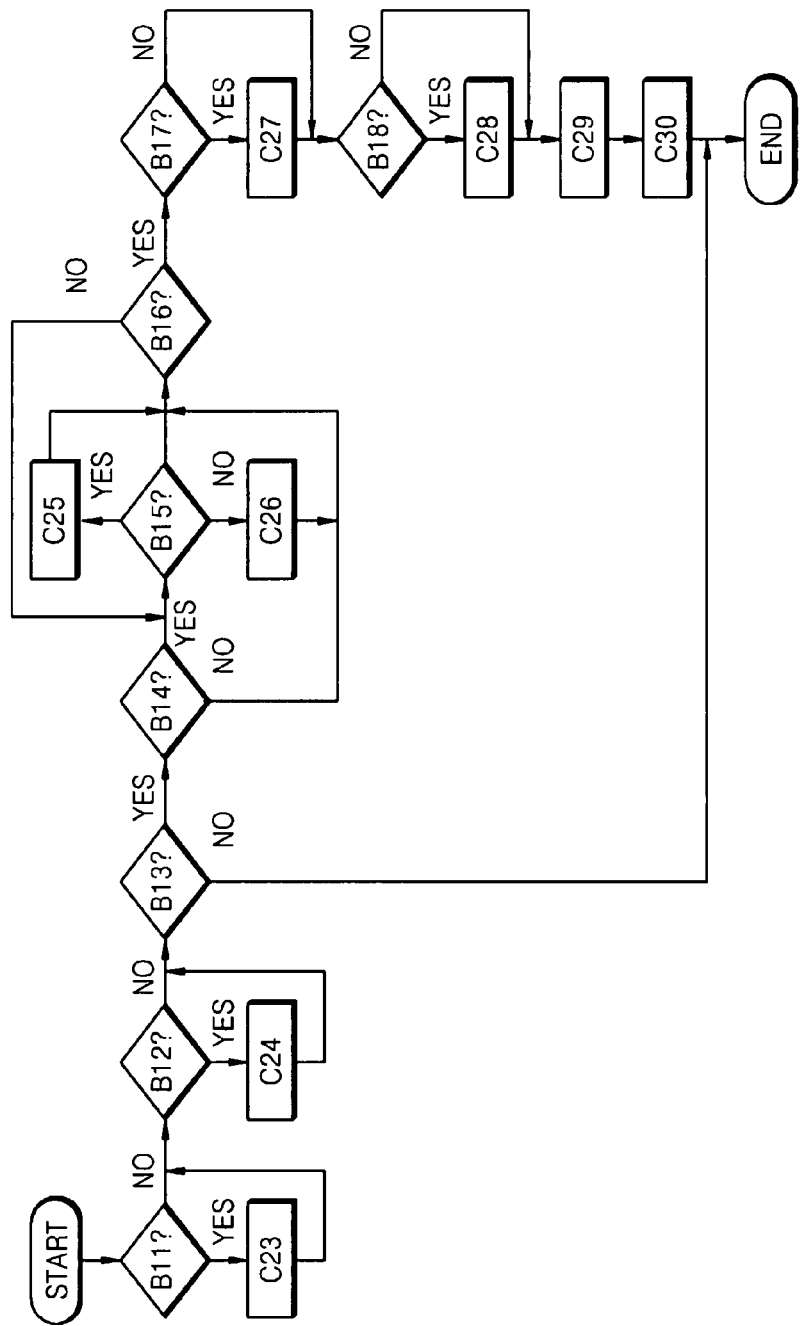
FIG. 17 illustrates a flowchart having branching blocks and code blocks for pixel processing, according to an embodiment of the present invention.

FIG. 17 is a flowchart having branching blocks and code blocks for pixel processing, according to an embodiment of the present invention.

Referring to FIG. 17, after analyzing pixel processing-related characteristics of 3D graphic data, if a branching block B11 determines 'yes,' a code block C23 is performed. If the branching block B11 determines 'no,' a branching block B12 makes a determination. If the branching block B12 determines 'yes,' a code block C24 is performed. If 'no,' a branching block B13 makes a determination. If the branching block B13 determines 'no,' pixel processing is terminated. If 'yes,' a branching block B14 makes a determination. If the branching block B14 determines 'no,' a branching block B16 makes a determination. If 'yes,' a branching block B15 makes a determination. If the branching block B15 determines 'yes,' a code block C25 is performed and then the branching block B16 makes a determination. If the branching block B16 determines 'no,' a code block C26 is performed and then the branching block B16 makes a determination. If the branching block B16 determines 'no,' the branching block B15 makes a determination. If the branching block B16 determines 'yes,' the branching block B17 makes a determination. If the branching block B17 determines 'yes,' a code block C27 is performed. If 'no,' a branching block B18 makes a determination. If the branching block B18 determines 'no,' code blocks C29 and C30 are performed. If 'yes,' code blocks C28 through C30 are performed, and pixel processing is terminated.

FIG. 18 illustrates the content of the branching blocks B11 through B18 included in the flowchart of FIG. 17.

The data analysis unit 110 may analyze pixel processing-related characteristics of input 3D graphic data and provide the function generation unit 120 with information regarding the characteristics of the 3D graphic data according to the determination of the branching blocks B11 through B18 illustrated in FIG. 18

FIG. 19 illustrates the content of the code blocks C23 through C30 included in the flowchart of FIG. 17.

When receiving information regarding pixel processing-related characteristics of 3D graphic data from the data analysis unit 110, the function generation unit 120 may read code blocks corresponding to the read information from the code blocks C23 through C30 illustrated in FIG. 19, and may generate a rendering function for pixel processing by combining the read code blocks.

Figure 20A:
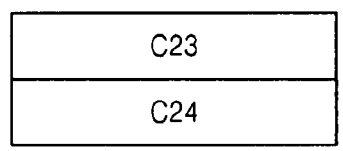
FIGS. 20A and 20B illustrate examples of rendering functions which can be generated in the flowchart of FIG. 17.
Figure 20B:
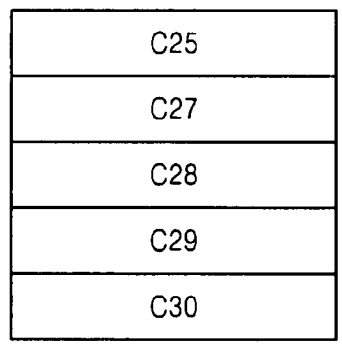

FIGS. 20A and 20B illustrate examples of rendering functions that can be generated in the flowchart of FIG. 17.

Referring to FIG. 20A, rendering function 1 is composed of the code blocks C23 and C24.

Referring to FIGS. 17 and 18, the data analysis unit 110 may analyze input 3D graphic data. The branching block B11, which determines whether to perform the Z test, determines 'no,' the branching block B12, which determines whether to perform the stencil test, determines 'no,' and the branching block B13, which determines whether to draw a current pixel based on the results of the Z test and stencil test, determines 'yes.' The branching block B14, which determines whether material information exists, determines 'yes,' the branching block B15, which determines whether to perform perspective correction, determines 'yes,' the branching block B16, which determines whether alpha testing and blending have been performed, determines 'yes,' and the branching block B18, which determines whether to perform a fog operation, determines 'yes.' The data analysis unit 110 provides the function generation unit 120 with information regarding the determined pixel processing-related characteristics of the 3D graphic data.

The function generation unit 120 may read the code blocks C25, C27, C28, C29 and C30 corresponding to the received information from the code blocks illustrated in FIG. 19, combine the read code blocks C25, C27, C28, C29 and C30, and generate rendering function 2. A rendering function generated in this way generally includes code blocks that are to be processed according to the characteristics of the 3D graphic data and may not include branching blocks.

As described above, the apparatus for rendering 3D graphic data using code blocks illustrated in FIG. 1A may not render all 3D graphic data using one rendering function which includes all codes that can be included in the rendering process in order to increase the rendering speed. Instead, the apparatus may generate a rendering function according to characteristics of input 3D graphic data. The rendering function thus generated may include code blocks that are to be processed according to the characteristics of the 3D graphic data and may not include branching blocks.

Therefore, the apparatus may bundle and store codes included in existing rendering functions in units of meaningful code blocks, combine necessary code blocks according to characteristics of input 3D graphic data, and thus form a new rendering function. In addition, once a rendering function is generated, the apparatus may store the generated rendering function in the cache 140. Then, if 3D graphic data having characteristics similar to those of 3D graphic data corresponding to the stored rendering function is input, the apparatus may use the rendering function stored in the cache 140 instead of generating a new rendering function. Consequently, the apparatus may further reduce the time required to render the 3D graphic data.

However, since the apparatus may consider only the characteristics of 3D graphic data when rendering the 3D graphic data, it may still fail to consider the state of power of a system performing the rendering operation. Therefore, it may be desirable to add a low-power driving mechanism to the apparatus in order to render 3D graphic data using a mobile device that runs on low power.

Hereinafter, a method and apparatus for rendering 3D graphic data, according to an embodiment of the present invention will now be described with reference to FIGS. 3 and 4.

Figure 3:
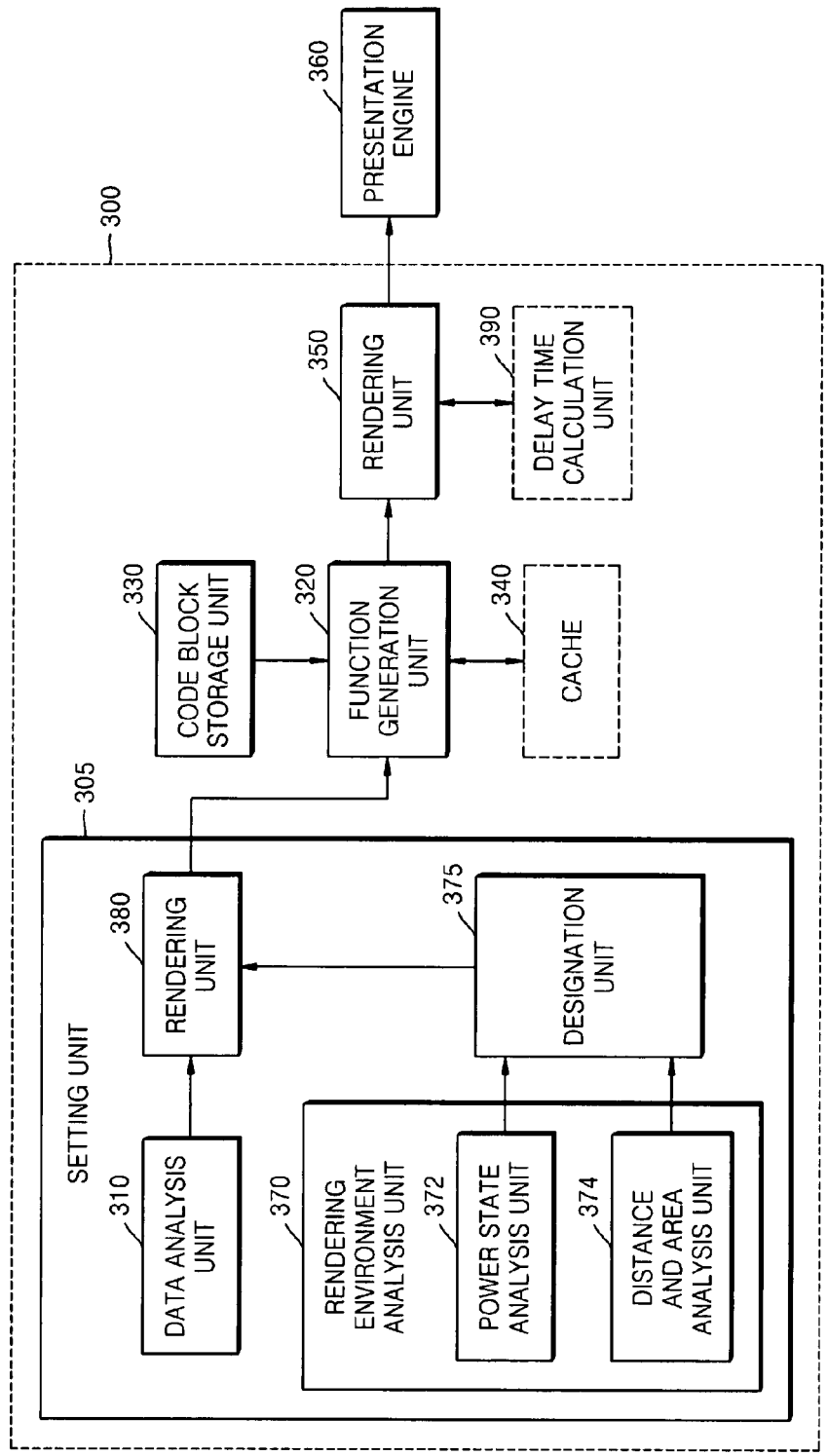
FIG. 3 is a schematic block diagram of an apparatus for rendering 3D graphic data, according to an embodiment of the present invention.
Figure 4:
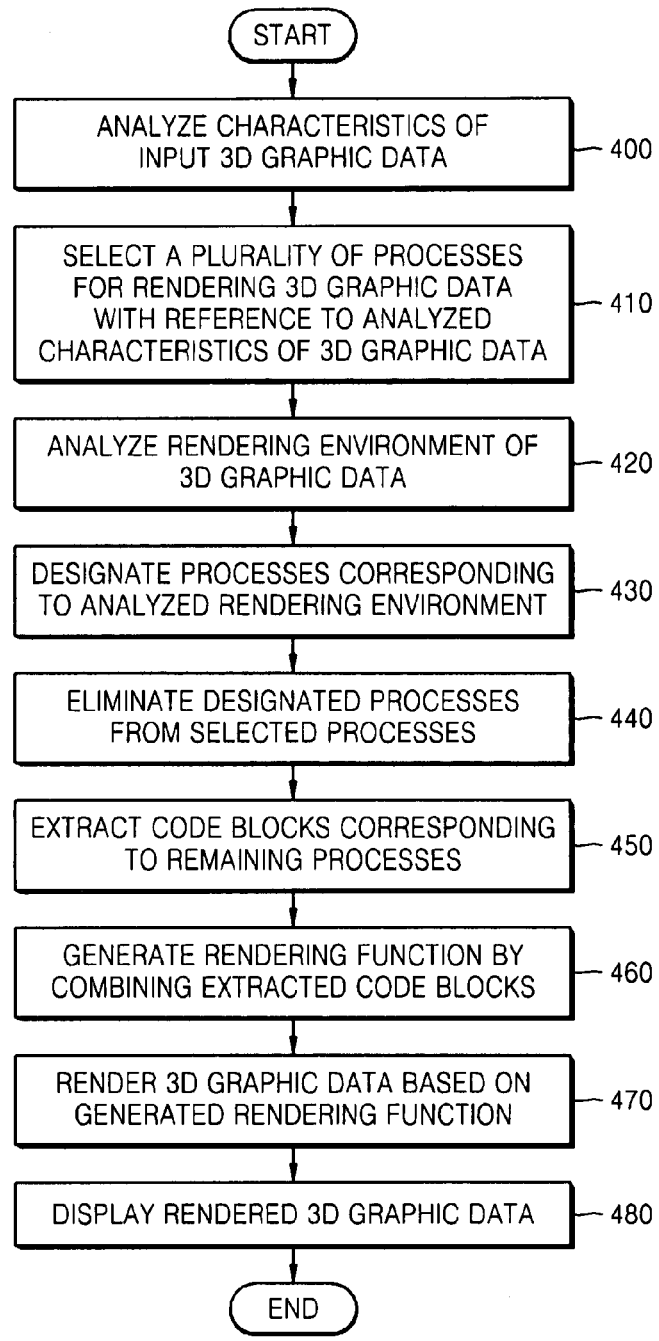
FIG. 4 is a flowchart illustrating a method of rendering 3D graphic data, according to an embodiment of the present invention.

FIG. 3 is a schematic block diagram of an apparatus for rendering 3D graphic data, according to an embodiment of the present invention. The apparatus may include, for example, a rendering engine 300 and a presentation engine 360.

The rendering engine 300 may receive 3D graphic data that is to be rendered, render the input 3D graphic data, and provide the result of rendering to the presentation engine 360. The presentation engine 360 may transmit the result of rendering to a display device, which may then display the rendered result.

The rendering engine 300 may include, for example, a setting unit 305, a function generation unit 320, a code block storage unit 330, a cache 340, and a rendering unit 350. The rendering engine 300 may further include, for example, a delay time calculation unit 390. The setting unit 305 may include, for example, a data analysis unit 310, a rendering environment analysis unit 370, a designation unit 375, and an elimination unit 380.

The data analysis unit 310 may analyze characteristics of the input 3D graphic data and select a plurality of processes for rendering the input 3D graphic data based on the analyzed characteristics. According to the conventional art described above with reference to FIGS. 1A and 2, the selected processes are those determined to be necessary based on the characteristics of the 3D graphic data and a series of rendering processes which do not include branch statements. The data analysis unit 310 may transmit information regarding the selected processes to the elimination unit 380.

Specific examples of processes selected based on characteristics of 3D graphic data will now be described with reference to FIGS. 11A through 11F. The processes may be predetermined processing processes desirable to render 3D graphic data, such as texture filtering, texture mipmapping, anti-aliasing, specular effect, dithering, and perspective correction. For convenience of description, the predetermined processing processes are defined as rendering options.

Specific functions of the rendering options will now be briefly described with reference to FIG. 11.

FIGS. 11A through 11F are conceptual diagrams for explaining the function of each rendering option. The result of rendering 3D graphic data using a rendering function in which each rendering option is off is illustrated on the left of FIGS. 11A through 11F. In addition, the result of rendering 3D graphic data using a rendering function in which each corresponding rendering option is on is illustrated on the right of FIGS. 11A through 11F.

Figure 11A:
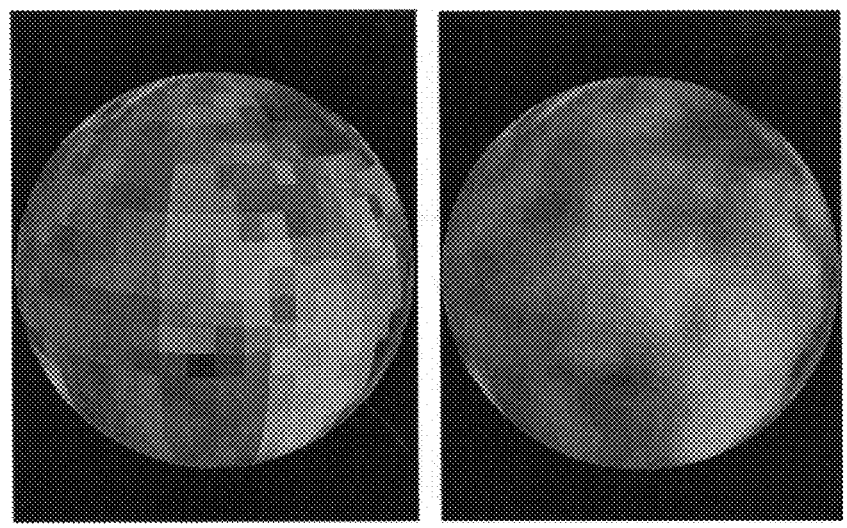
FIGS. 11A through 11F are conceptual diagrams for explaining predetermined processes for rendering 3D graphic data.

Specifically, FIG. 11A is a conceptual diagram explaining the effect of texture filtering, which is one of the rendering options. Since the texture of 3D graphic data is mapped in units of texels, pixels within a texel may have identical values. Therefore, the boundaries between texels may be unnaturally represented as if they are angled. To solve this problem, texture filtering may be performed on the 3D graphic data. Various texture filtering methods may be used. A method of performing crossed linear interpolation on a weight of a corresponding vertex with reference to neighbouring pixels of a corresponding pixel and generating a new pixel is applied to FIG. 9A. When this method is used, various textures and colors may be expressed even within one texel, and the boundaries between texels may be naturally expressed.

Figure 11B:
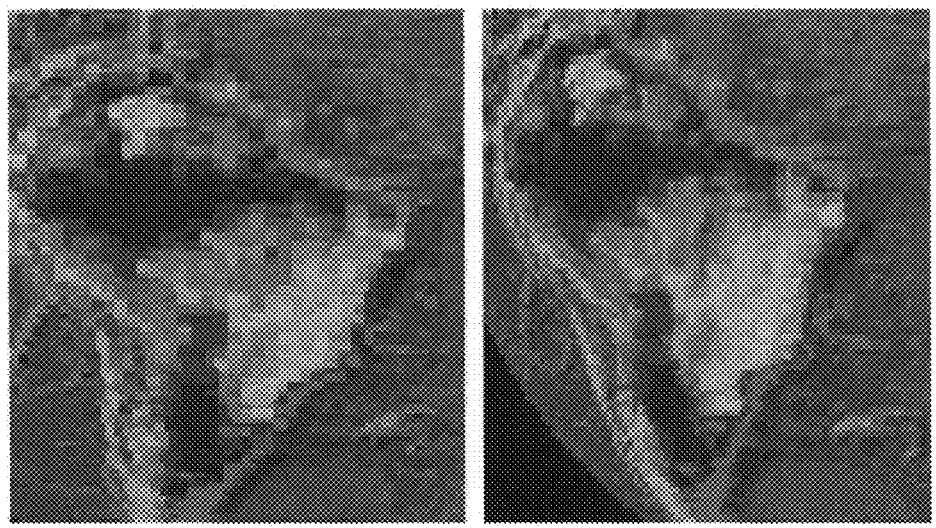

FIG. 11B is a conceptual diagram explaining the effect of texture mipmapping, which is one of the rendering options. Texture mipmapping may refer to creating pictures of various sizes for an identical object and performing texture mapping using a mip map of a size most similar to that of a polygon that is to be mapped. Since texture is mechanically reduced in texture mipmapping, changes in image quality may be prevented.

Figure 11C:
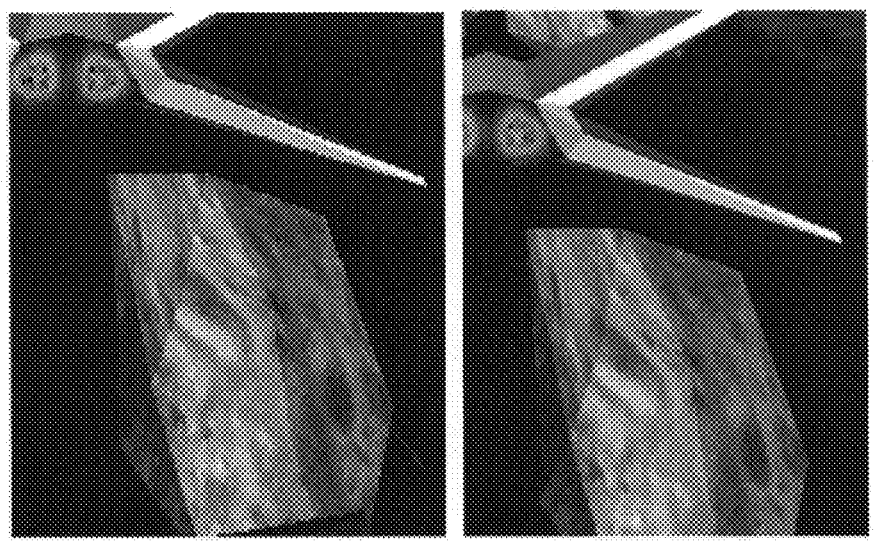

FIG. 11C is a conceptual diagram for explaining the effect of anti-aliasing, which is one of the rendering options. Aliasing denotes a defect that can be generated when 3D graphic data is insufficiently sampled according to a Nyquist sampling theorem, or is inappropriately filtered. Here, the boundary of an image may be represented like a staircase. To eliminate the aliasing effect, the anti-aliasing process is desirable. In the anti-aliasing process, the boundary of an image may be filled with a neutral color between the color of the background and that of the image in phases so that the boundary may be represented smoothly.

Figure 11D:
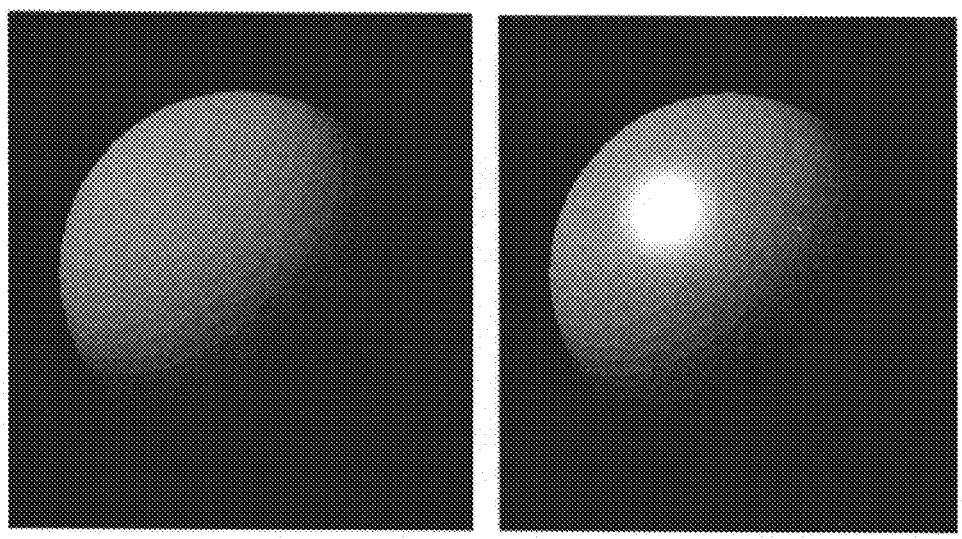

FIG. 11D is a conceptual diagram explaining the specular effect, which is one of the rendering options. The specular effect generally refers to a processing technique for making a surface of a target object look as if the surface reflects light according to the position of a light source, an angle at which the target object is represented, and an angle of a point of view.

Figure 11E:
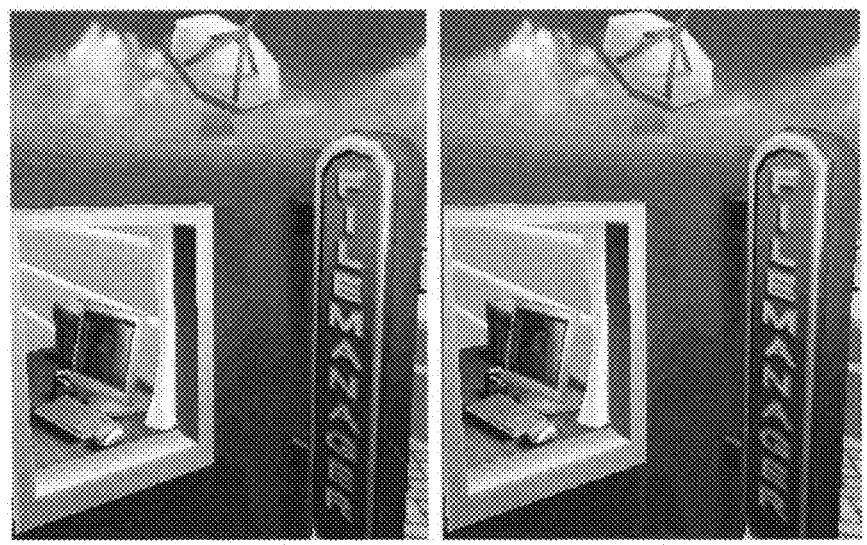

FIG. 11E is a conceptual diagram explaining the effect of dithering, which is one of the rendering options. Dithering is generally a technique for processing each surface of an image using pixels in different gray-scale colors in order to properly express multi-gray scale colors, which exceed the resolution of a display device displaying 3D graphic data.

Figure 11F:
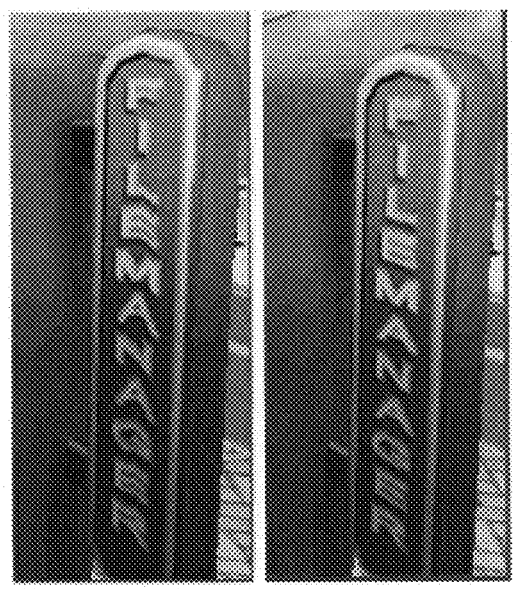

FIG. 11F is a conceptual diagram explaining the effect of perspective correction, which is one of the rendering options. To represent 3D data on a 2D screen, it may be required to project the 3D data onto the 2D screen. Here, perspective projection or orthographic projection may be used. Perspective projection is generally a process of projecting a 3D object onto a 2D screen using the laws of perspective. However, in this process, a texture image may be deformed resulting in a bent shape. In order to compensate for such a deformation, perspective correction may be performed.

The rendering options have been roughly described above. In addition to the rendering options described above, various techniques for realistically expressing 3D graphic data may be applied to embodiments of the present invention. Therefore, the present invention is not limited to the rendering options described above. It is obvious that various rendering options, which can be easily derived by those of ordinary skill in the art to which the present invention pertains, can be applied to the present invention, which is within the scope of the present invention.

Hereinafter, other elements of the rendering engine 300 will be described referring back to FIG. 3.

The rendering environment analysis unit 370 may analyze a rendering environment of the input 3D graphic data. The rendering environment may include, for example, a state of power of a system rendering 3D graphic data, the distance between an object represented by the 3D graphic data and a camera, and the size of the object represented on the screen. The rendering environment analysis unit 370 may provide information regarding the analyzed rendering environment to the designation unit 375.

Based on the information pertaining to the analyzed rendering environment, the designation unit 375 may designate rendering options for elimination from the rendering options selected by the data analysis unit 310 and transmit information regarding the designated rendering options to the elimination unit 380.

In order to designate rendering options for elimination, the designation unit 375 may receive information regarding the rendering options selected by the data analysis unit 310 and designate rendering options to be eliminated in order of least to most effect on image quality represented by 3D graphic data. Alternatively, the designation unit 375 may designate rendering options for elimination in order of least to most effect on image quality in consideration of the characteristics of 3D graphic data, or the distance and area analyzed by a distance and area analysis unit 374, which will be described in greater detail later.

The elimination unit 380 may receive the information regarding the selected rendering options from the data analysis unit 310 and receive the rendering options for elimination, which were designated by the designation unit 375 in consideration of the rendering environment. Then, the elimination unit 380 may eliminate the designated rendering options from the selected rendering options. Information regarding the remaining rendering options may be provided to the function generation unit 320.

The function generation unit 320 may read one or more code blocks performing predetermined processing processes for rendering 3D graphic data that corresponds to the remaining rendering options received from the elimination unit 380, generate a rendering function by combining the read code blocks, and provide the generated rendering function to the rendering unit 350. Alternatively, the function generation unit 320 may search the cache 140 for a rendering function corresponding to the received remaining rendering options, retrieve the rendering function, if found, from the cache 140, and provide the retrieved rendering function to the rendering unit 350. A code block may denote a bundle of codes performing predetermined processing processes for rendering 3D graphic data.

Since the code block storage unit 330 and the cache 340 are similar to the code block storage unit 130 and the cache 140 illustrated in FIG. 1, a detailed description thereof will be omitted.

The rendering unit 350 may render the input 3D graphic data using the received rendering function and transmit the rendered 3D graphic data to the presentation unit 360.

The presentation unit 360 may display the rendered 3D graphic data.

A method of rendering 3D graphic data, according to an embodiment of the present invention will now be described with reference to FIG. 4.

Though embodiments of the present invention have and will be described with reference to particular systems, e.g., rendering engine 300, with corresponding particular operations, embodiments of the present invention should not be limited thereto. Aspects of the invention may be accomplished through varying systems and varying operations.

In operation 400, characteristics of input 3D graphic data may be analyzed, e.g. by rendering engine 300.

In operation 410, the rendering engine 300 may select a plurality of processes for rendering 3D graphic data with reference to analyzed characteristics of 3D graphic data. As described above, these processes may be for performing functions such as texture filtering and anti-aliasing.

In operation 420, the rendering engine 300 may analyze a rendering environment of input 3D graphic data.

In operation 430, the rendering engine 300 may designate at least one process corresponding to the analyzed rendering environment for elimination.

In operation 440, the rendering engine 300 may eliminate the at least one process from a plurality of processes designated.

In operation 450, the rendering engine 300 may extract at least one code block corresponding to the remaining processes.

In operation 460, the rendering engine 300 may generate a rendering function by combining the extracted at least one code block.

In operation 470, the rendering engine 300 may render 3D graphic data based on the generated rendering function.

In operation 480, the presentation engine 360 may receive the rendered 3D graphic data from the rendering engine 300 and display the received 3D graphic data.

As described above, the method and apparatus for rendering 3D graphic data, according to an embodiment of the present invention, may eliminate some processes designated in consideration of the rendering environment of the 3D graphic data from a plurality of processes which are selected based on characteristics of the 3D graphic data, generate a rendering function including the remaining processes, and render the 3D graphic data using the generated rendering function. In other words, the number of rendering options included in a rendering function may be reduced in the present invention.

As described above with reference to FIGS. 11A through 11F, when rendering options are added, high-quality 3D graphics may be implemented. However, as the number of additional rendering options increases, the amount of calculation required also increases, which, in turn, generally increases power consumption. Admittedly, image quality of 3D graphics is typically improved when rendering options are used. However, even when the rendering options are not used, 3D graphic contents themselves do not change. In addition, some rendering options may not greatly contribute to the improvement of image quality. For example, when a sampling rate of 3D graphic data is sufficiently guaranteed, the aliasing effect may not be apparent. Furthermore, even when anti-aliasing is not performed, the deterioration of image quality may not be severe. When a system performing the rendering operation suffers from a shortage of power or when a rendering option fails to improve image quality, an embodiment of the present invention performs the rendering operation using a rendering function which excludes the rendering option, thereby preventing additional power consumption.

In particular, if all rendering options are performed when the remaining power of a system is insufficient, the rendering options may not be properly performed due to the shortage of power, or 3D graphic data may not be rendered in the first place. Therefore, rendering options may be sequentially excluded in order of least to most effect on the improvement of image quality, in an embodiment of the present invention. Since the present embodiment may render 3D graphic data using rendering options set in consideration of the state of power of the system, it may stably render the 3D graphic data even in a limited power condition while minimizing the deterioration of image quality.

FIG. 5 is a table showing the rendering speed improved after some rendering options are turned off. The table of FIG. 5 shows the number of frames processed per second (FPS: frames per second) according to on/off of a rendering option. A reciprocal of the FPS denotes the time spent on rendering one frame. As the time spent on rendering one frame increases, power consumption increases. Therefore, the relative amount of power consumption in the rendering process may be estimated using the FPS values shown in the table.

Referring to the table of FIG. 5, a case A where both texture filtering and perspective correction are off shows higher FPS values than those of the other cases B, C and D. Hence, it can be understood that relatively less power is consumed in case A. On the other hand, case D where both texture filtering and perspective correction are on shows the lowest FPS value. Hence, it can be understood that relatively greater power is consumed in case D. In this way, if 3D graphic data is rendered using a rendering function which excludes unnecessary rendering options, a rendering engine which runs on low power while minimizing the deterioration of image quality may be implemented.

Methods of rendering 3D graphic data according to various embodiments of the present invention will now be described with reference to FIGS. 6A through 9B.

First of all, an embodiment of the present invention will be described with reference to FIGS. 3 and 6B. According to the embodiment, the rendering environment analysis unit 370 may include only a power state analysis unit 372.

The power state analysis unit 372 may analyze the current state of power of a system rendering 3D graphic data and provide the analysis result to the designation unit 375. The state of power of the system may include, for example, the remaining power of the system or the amount of power that can be used for the system to render 3D graphic data.

A case where the power state analysis unit 372 analyses the remaining power of the system will now be described as an example. In this case, as illustrated in FIG. 6B, the designation unit 375 may preset a minimum remaining power that turns a rendering option off to correspond to the rendering option, compare the analyzed remaining power with the preset minimum remaining power, and, if the minimum remaining power is more than the analyzed remaining power, designate the rendering option as a rendering option to be eliminated.

In this corresponding relationship, the states of power listed in order of highest to lowest remaining power may be set to respectively correspond to rendering options listed in order of least to most effect on image quality, respectively. For example, if texture filtering (A), texture mipmap (B), anti-aliasing (C), specular (D), dithering (E) and perspective correction (F) are to be turned off in order of (C), (D), (E), (B), (A) and (F), that is, in order of least to most effect on image quality, minimum remaining powers POWER_A through POWER_F that turn respective rendering options off may be set to correspond to the rendering options (A) through (F) in the order in which the rendering options (A) through (F) are to be turned off. In other words, the minimum remaining power POWER_C may be set highest, and the minimum remaining power POWER_F may be set lowest.

Alternatively, the designation unit 375 may set the minimum remaining powers POWER_A through POWER_F so that the rendering options (A) through (F) are turned off in order of least to most effect on image quality. In this case, the designation unit 375 may determine the order of the minimum remaining powers POWER_A through POWER_F in consideration of the characteristics of 3D graphics analyzed by the data analysis unit 610. In addition, values of the minimum remaining powers POWER_A through POWER_F may be set in consideration of the distance and area analyzed by the distance and area analysis unit 374, which will be described in greater detail later.

Figure 6A:
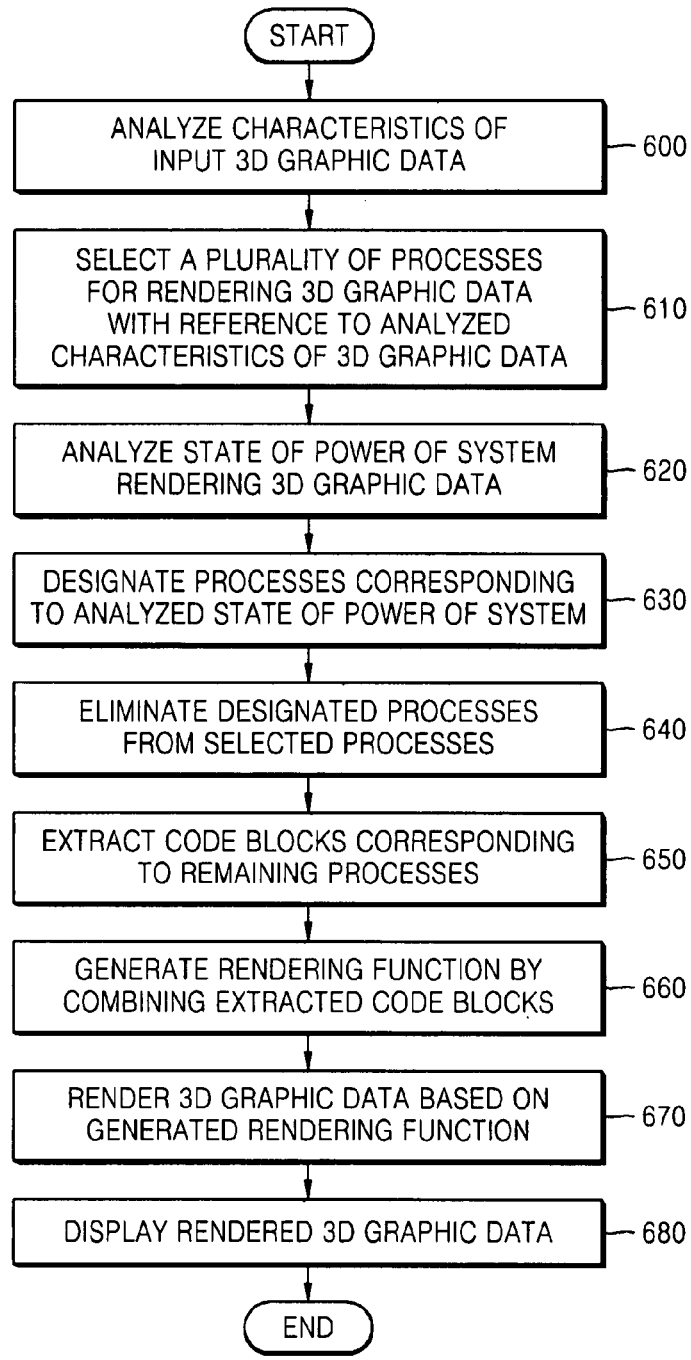
FIG. 6A is a flowchart illustrating a method of rendering 3D graphic data according to an embodiment of the present invention.

FIG. 6A is a flowchart illustrating a method of rendering 3D graphic data, according to an embodiment of the present invention.

In operation 600, the rendering engine 300 may analyze characteristics of input 3D graphic data.

In operation 610, the rendering engine 300 may select a plurality of processes for rendering the input 3D graphic data with reference to the analyzed characteristics of the input 3D graphic data.

In operation 620, the rendering engine 300 may analyse the current state of power of a system rendering the input 3D graphic data.

In operation 630, the rendering engine 300 may designate at least one of the processes for elimination according to the analyzed state of power of the system.

In operation 640, the rendering engine 300 may eliminate the designated at least one process from the selected processes.

In operation 650, the rendering engine 300 may extract at least one code block corresponding to remaining processes after the at least one process is eliminated from the selected processes.

In operation 660, the rendering engine 300 may combine the extracted at least one code block and generate a rendering function.

In operation 670, the rendering engine 300 may render the input 3D graphic data based on the generated rendering function.

In operation 680, the presentation engine 360 may receive the rendered 3D graphic data from the rendering engine 300 and display the received 3D graphic data.

As described above, according to an embodiment of the present invention, a rendering function may be generated in consideration of the state of power of a system rendering input 3D graphic data and according to the limited state of power of the system. Therefore, power consumption may be reduced, and the rendering operation may be performed in a stable manner even in a limited power condition.

An embodiment of the present invention will now be described with reference to FIGS. 3 and 7B. According to the embodiment of the present invention, the rendering environment analysis unit 370 may include only the distance and area analysis unit 374.

The distance and area analysis unit 374 may analyze the distance between a target object, which is represented by 3D graphic data, and a camera and transmit the analysis result to the designation unit 375.

As illustrated in FIG. 7B, the designation unit 375 may preset a minimum distance that turns a rendering option off to correspond to the rendering option, compare the analyzed distance with the preset minimum distance, and, if the minimum distance is greater than the analyzed distance, designate the rendering option as a rendering option for elimination.

In the corresponding relationship between rendering options illustrated in FIG. 7B and minimum distances that turn off the rendering options, respectively, the minimum distances may be set to respectively correspond to the rendering options so that the rendering options listed in order of effect on image quality are sequentially designated as rendering options for elimination as the distance between an object represented by 3D graphic data and a camera increases. In other words, values of the minimum distance listed from highest to lowest may be set to respectively correspond to the rendering options listed in order of least to most effect on image quality.

Figure 7A:
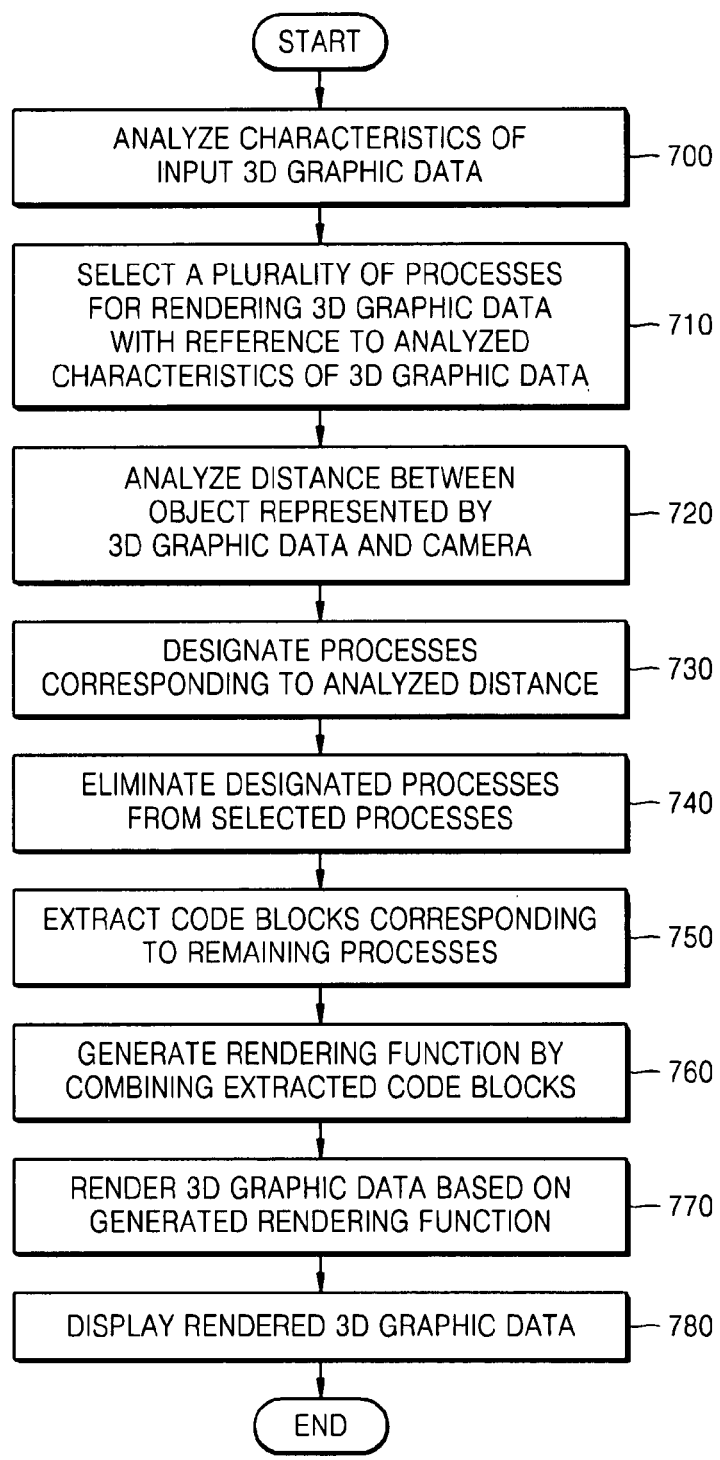
FIG. 7A is a flowchart illustrating a method of rendering 3D graphic data according to an embodiment of the present invention.

FIG. 7A is a flowchart illustrating a method of rendering 3D graphic data, according to an embodiment of the present invention.

In operation 700, the rendering engine 300 may analyze characteristics of input 3D graphic data.

In operation 710, the rendering engine 300 may select a plurality of processes for rendering the input 3D graphic data with reference to the analyzed characteristics of the input 3D graphic data.

In operation 720, the rendering engine 300 may analyze the distance between an object, which is represented by the input 3D graphic data, and a camera.

In operation 730, the rendering engine 300 may designate at least one of the processes according to the analyzed distance for elimination.

In operation 740, the rendering engine 300 may eliminate the designated at least one process from the selected processes.

In operation 750, the rendering engine 300 may extract at least one code block corresponding to remaining processes after the at least one process is eliminated from the selected processes.

In operation 760, the rendering engine 300 may combine the extracted at least one code block and generate a rendering function.

In operation 770, the rendering engine 300 may render the input 3D graphic data based on the generated rendering function.

In operation 780, the presentation engine 360 may receive the rendered 3D graphic data from the rendering engine 300 and display the received 3D graphic data.

As described above, according to tan embodiment of the present invention, a rendering function, which may exclude unnecessary rendering options, is generated in consideration of the distance between an object, which is represented by input 3D graphic data, and a camera. Therefore, power consumption required for rendering the input 3D graphic data may be reduced while minimizing the deterioration of image quality. For example, an object located a large distance from a camera is displayed as a small object on the screen. Therefore, the rendering option 'specular,' which expresses the reflection of light, may be unnecessary. Since unnecessary rendering options are excluded in this way, power consumption can be reduced while there is no difference in image quality perceived by a user.

However, if only the distance between an object and a camera is considered as in an embodiment of the present invention, the real size of the object cannot be considered. For example, even when the distances between objects and a camera are equal, areas occupied by large-sized objects on the screen are wider than those occupied by small-sized objects. Therefore, it is may be desirable to render the large-sized objects more delicately than the small-sized objects. In embodiments of the present invention, a rendering function may be generated in consideration of an area occupied by an object on the screen in order to solve the problems mentioned above.

An embodiment of the present invention will now be described with reference to FIGS. 3 and 8B. According to an embodiment of the present invention, the rendering environment analysis unit 370 may include the distance and area analysis unit 374 only.

The distance and area analysis unit 374 may analyze an area occupied by an object represented by 3D graphic data on the screen, and may transmit the analysis result to the designation unit 375.

As illustrated in FIG. 8B, the designation unit 375 may preset a minimum area that turns a rendering option off to correspond to the rendering option, compare the analyzed area with the preset minimum area, and, if the minimum area is smaller than the analyzed area, may designate the rendering option as a rendering option for elimination.

In this corresponding relationship, values of areas listed from highest to lowest may be set to respectively correspond to the rendering options listed in order of least to most effect on image quality, which is represented by 3D graphic data. In other words, minimum area values may be set to respectively correspond to the rendering options so that the rendering options listed in order of least to most effect on image quality are sequentially eliminated as the values of the areas occupied by objects on the screen decrease.

Figure 8A:
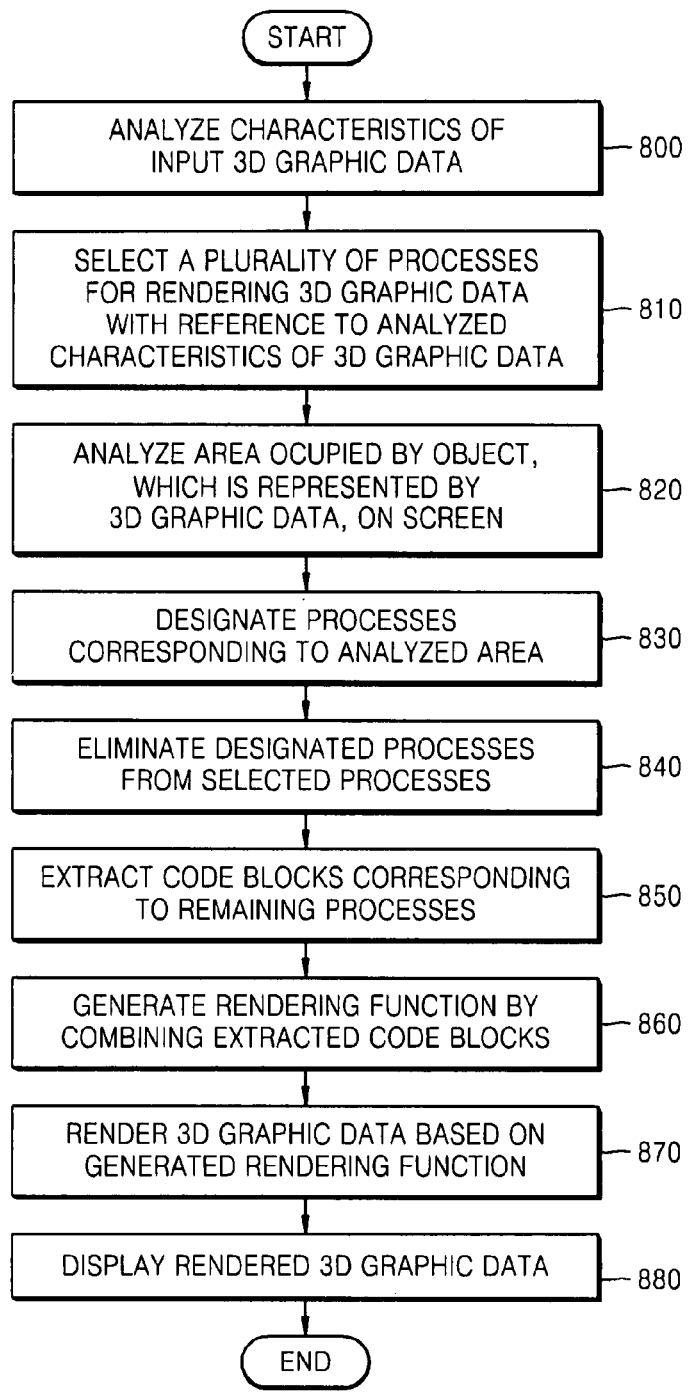
FIG. 8A is a flowchart illustrating a method of rendering 3D graphic data, according to an embodiment of the present invention.

FIG. 8A is a flowchart illustrating a method of rendering 3D graphic data according to an embodiment of the present invention.

In operation 800, the rendering engine 300 may analyze characteristics of input 3D graphic data.

In operation 810, the rendering engine 300 may select a plurality of processes for rendering the input 3D graphic data with reference to the analyzed characteristics of the input 3D graphic data.

In operation 820, the rendering engine 300 may analyze an area occupied by an object, which is represented by the input 3D graphic data, on the screen.

In operation 830, the rendering engine 300 may designate at least one of the processes according to the analyzed area for elimination.

In operation 840, the rendering engine 300 may eliminate the designated at least one process from the selected processes.

In operation 850, the rendering engine 300 may extract at least one code block corresponding to remaining processes after the at least one process is eliminated from the selected processes.

In operation 860, the rendering engine 300 may combine the extracted at least one code block and generate a rendering function.

In operation 870, the rendering engine 300 may render the input 3D graphic data based on the generated rendering function.

In operation 880, the presentation engine 360 may receive the rendered 3D graphic data from the rendering engine 300 and display the received 3D graphic data.

As described above, according to an embodiment of the present invention, a rendering function that excludes unnecessary rendering options may be generated in consideration of an area occupied by an object represented by input 3D graphic data on the screen. Therefore, power consumption required for rendering the input 3D graphic data may be reduced while minimizing the deterioration of image quality. In particular, when objects are located an equal distance from a camera but have different sizes, areas occupied by the objects on the screen may be different. Here, an object occupying a larger area of the screen may need to be rendered more delicately than an object occupying a smaller area. Also, different rendering options may be performed for objects that occupy different-sized areas of the screen. Since an area occupied by an object on the screen, which directly affects a user's perception of image quality, is considered, the deterioration of image quality may be better prevented than when only the distance between the object and a camera is considered. This is because image quality can unexpectedly deteriorate if some rendering options are excluded based only on the distance between the object and the camera, although the area occupied by the object on the screen is large.

An embodiment of the present invention will now be described with reference to FIGS. 3 and 9B. According to an embodiment of the present invention, the rendering environment analysis unit 370 may include the distance and area analysis unit 374 and designate a rendering option for elimination by comprehensively considering both the distance between an object, which is represented by input 3D graphic data, and a camera and an area occupied by the object on the screen.

The distance and area analysis unit 374 may analyze the distance between an object represented by 3D graphic data and a camera, and an area occupied by the object on the screen, and may transmit the analysis result to the designation unit 375.

The designation unit 375 may comprehensively consider the distance and area analyzed by the distance and area analysis unit 374 and may designate a rendering option to be eliminated. For example, the designation unit 374 may calculate a function value that considers both the distance and area, using Equation (1) below and may designate a rendering option corresponding to the calculated function value.

Equation 1:

$$f(d,s)=a*(D-d)/D+(1-a)*s/S,$$

a: weight ($0 \leq a \leq 1$)
d: distance between a target object and a camera
s: an area occupied by the target object on the screen
D: a constant set as a maximum distance value
S: a constant set as a maximum area value.

In Equation (1), the function value f (d, s) is between 0 and 1, and the weight "a" may be adjusted according to a user's request and/or the characteristics of 3D graphic data. For example, if an area occupied by an object on the screen is an important factor in terms of setting rendering options, the weight "a" may be set to 0 so that the rendering options can be set by considering only the area occupied by the object on the screen without considering the distance between the object and the camera. Conversely, if the distance between the object and the camera is an important factor, the weight "a" may be set to 1. In addition, if the distance and area are to be equally considered, the weight "a" may set to 0.5 in order to calculate the function value f (d, s).

As illustrated in FIG. 9B, the designation unit 375 presets f (d, s) that turns a rendering option off to correspond to the rendering option, compares a calculated function value with the preset function value f (d, s), and, if the rendering option corresponds to the calculated function value, may designate the rendering option as a rendering option for elimination. A function value generally decreases as the distance between an object and a camera increases and an area occupied by the object on the screen decreases. Therefore, in this corresponding relationship, a plurality of function values listed from highest to lowest may be set to respectively correspond to a plurality of rendering options listed in order of least to most effect on image quality. In other words, function values, i.e., f (d, s), may be set to respectively correspond to the rendering options so that the rendering options listed in order of least to most effect on image quality are sequentially eliminated as the function values decrease.

Figure 9A:
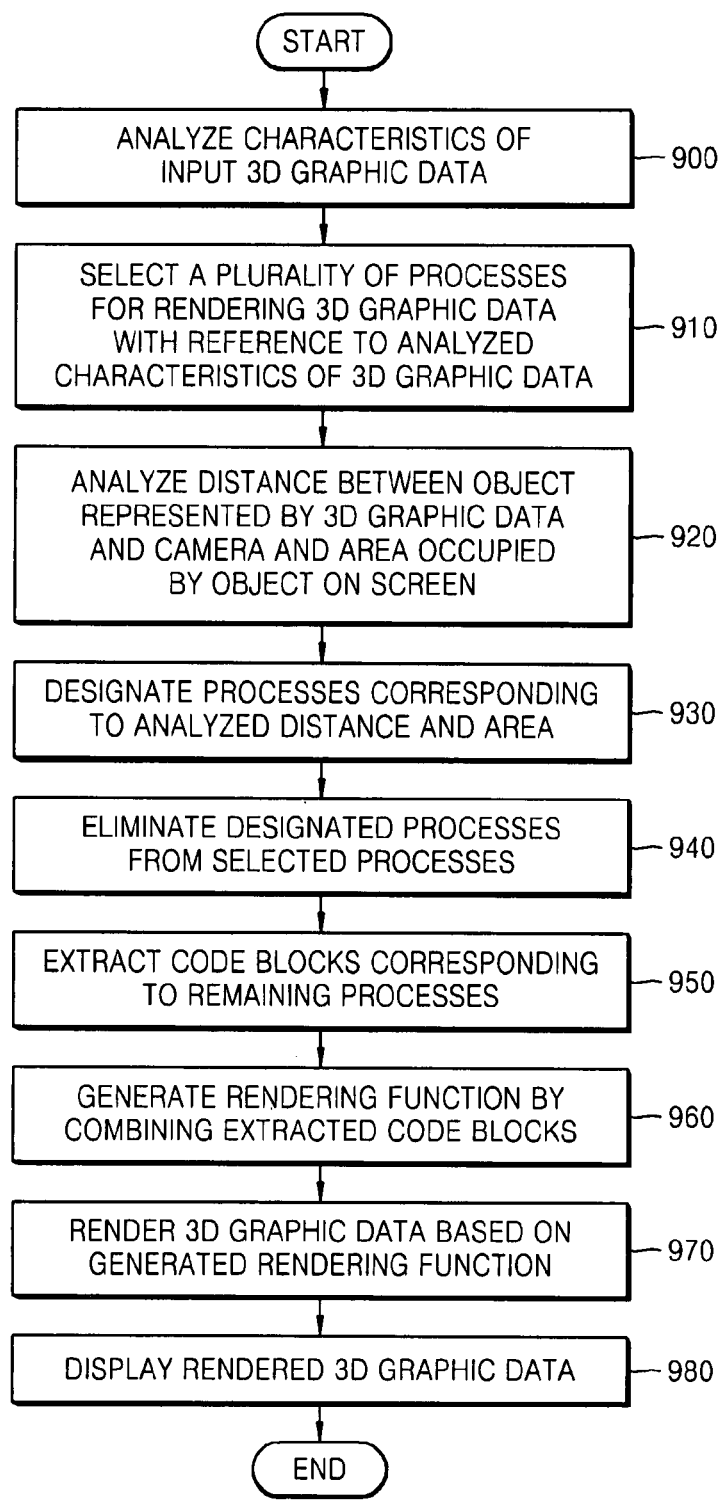
FIG. 9A is a flowchart illustrating a method of rendering 3D graphic data according to an embodiment of the present invention.

FIG. 9A is a flowchart illustrating a method of rendering 3D graphic data, according to an embodiment of the present invention.

In operation 900, the rendering engine 300 may analyze characteristics of input 3D graphic data.

In operation 910, the rendering engine 300 may select a plurality of processes for rendering the input 3D graphic data with reference to the analyzed characteristics of the input 3D graphic data.

In operation 920, the rendering engine 300 may analyze the distance between an object, which is represented by the input 3D graphic data, and a camera and an area occupied by the object on the screen.

In operation 930, the rendering engine 300 may designate at least one of the processes according to the analyzed distance and area for elimination. In other words, the rendering engine 300 may designate at least one process corresponding to a value calculated using the distance and area for elimination.

In operation 940, the rendering engine 300 may eliminate the designated at least one process from the selected processes.

In operation 950, the rendering engine 300 may extract at least one code block corresponding to remaining processes after the at least one process is eliminated from the selected processes.

In operation 960, the rendering engine 300 may combine the extracted at least one code block and generates a rendering function.

In operation 970, the rendering engine 300 may render the input 3D graphic data based on the generated rendering function.

In operation 980, the presentation engine 360 may receive the rendered 3D graphic data from the rendering engine 300 and display the received 3D graphic data.

As described above, according to an embodiment of the present invention, a rendering function that excludes unnecessary rendering options may be generated by comprehensively considering both the distance between an object represented by input 3D graphic data and a camera and an area occupied by the object on the screen. Therefore, power consumption required for rendering the input 3D graphic data may be reduced while minimizing the deterioration of image quality. In particular, since the distance and area are comprehensively considered, the deterioration of image quality may be better prevented.

Figure 12:
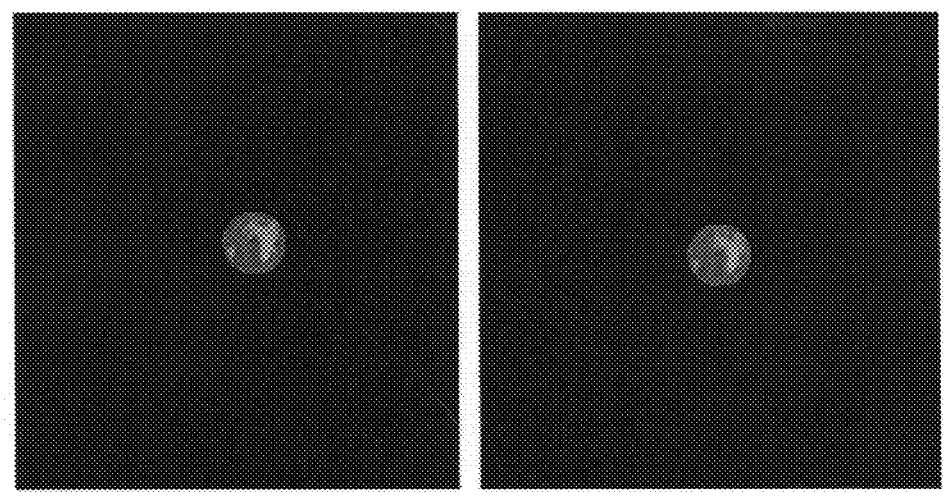
FIG. 12 is a conceptual diagram for explaining the result of rendering 3D graphic data according to the embodiment illustrated in FIGS. 9A and 9B.

FIG. 12 is a conceptual diagram illustrating relatively little deterioration of image quality as a result of rendering 3D graphic data using a rendering function generated in consideration of the distance between an object and a camera and an area occupied by the object on the screen. Specifically, the rendered result illustrated on the left of FIG. 12 has been achieved after input 3D graphic data is rendered using a rendering function that excludes texture filtering in consideration of the distance and area. In addition, the rendered result illustrated on the right of FIG. 12 has been achieved after the input 3D graphic data is rendered using a rendering function which includes texture filtering. While the rendering process performed to achieve the rendered result on the left is faster and consumes less power than that performed to achieve the rendered result on the right, there is virtually no difference in image quality between the two rendered results.

As described above, the method and apparatus for rendering 3D graphic data according to the present invention may exclude some of a plurality of rendering options included in a series of processes selected based on characteristics of 3D graphic data, in consideration of the rendering environment of the 3D graphic data. Therefore, as illustrated in FIG. 5, the rendering speed may be increased. However, if the number of frames to be processed is increased as the rendering speed increases, the power consumed in processing one frame may be reduced but there would be no noticeable difference in the power consumed over a predetermined period of time.

Furthermore, there is a limit to image quality perceived by human beings. Therefore, even when a frame transmission rate is increased to exceed a predetermined rate, there is no significant difference in image quality perceived by human beings. For example, even when an animation is output at a transmission rate of 24 fps, or greater, or when television image data is output at a transmission rate of 29.9 fps, or greater, there is no significant improvement in image quality perceived by human beings.

Therefore, according to an embodiment of the present invention, the rendering unit 350 may not render more than a predetermined number of frames of 3D graphic data over a predetermined period of time. Here, a frame may denote a processing unit in which 3D graphic data is rendered.

Since the presentation engine 360 generally displays the rendered result received from the rendering unit 350 in real time, the number of frames rendered by the rendering unit 350 may optimally be controlled in order to control the transmission rate of 3D graphic data.

For example, if the transmission rate of 3D graphic data is to be controlled so as not to exceed 30 fps, the rendering engine 300 may optimally be controlled to render no more than 30 frames of the 3D graphic data per second.

In order to control the rendering unit 350 not to render more than a predetermined number of frames over a predetermined period of time, the apparatus for rendering 3D graphic data according to the present invention may further include the delay time calculation unit 390.

The delay time calculation unit 390 may calculate maximum time T-max that can be used to render a frame of 3D graphic data using a preset maximum transmission rate and measure the real time T-real taken for the rendering unit 350 to render a current frame. The delay time calculation unit may calculate a delay time T_delay by subtracting the real time T_real from the calculated maximum time T-max and transmits the calculated delay time T_delay to the rendering unit 350. If the real time T_real is longer than the calculated maximum time T_real, the delay time T_delay may be a negative number. Here, the delay time calculation unit 390 may correct the delay time T_delay to zero and transmit the corrected delay time T_delay to the rendering unit 350 so that the rendering unit 350 may render a next frame without delay.

The rendering unit 350 may receive the delay time T_delay calculated by the delay time calculation unit 390, wait the received delay time T_delay, and then render a next frame.

For example, if the maximum transmission rate is set to 30 fps, the maximum time T_max that generally may be used to render a frame is 1000 ms/30 fps, i.e., 33.3 ms. In this case, if the real time T_real is 15 ms, the delay time T_delay is 33.3 ms−15 ms=18.3 ms. The rendering unit 350 may receive the delay time T_delay of a current frame, wait 18.3 ms, and render a next frame. The maximum transmission rate may be flexibly set according to the type of input 3D graphic data or specifications of a system rendering the input 3D graphic data.

Figure 10:
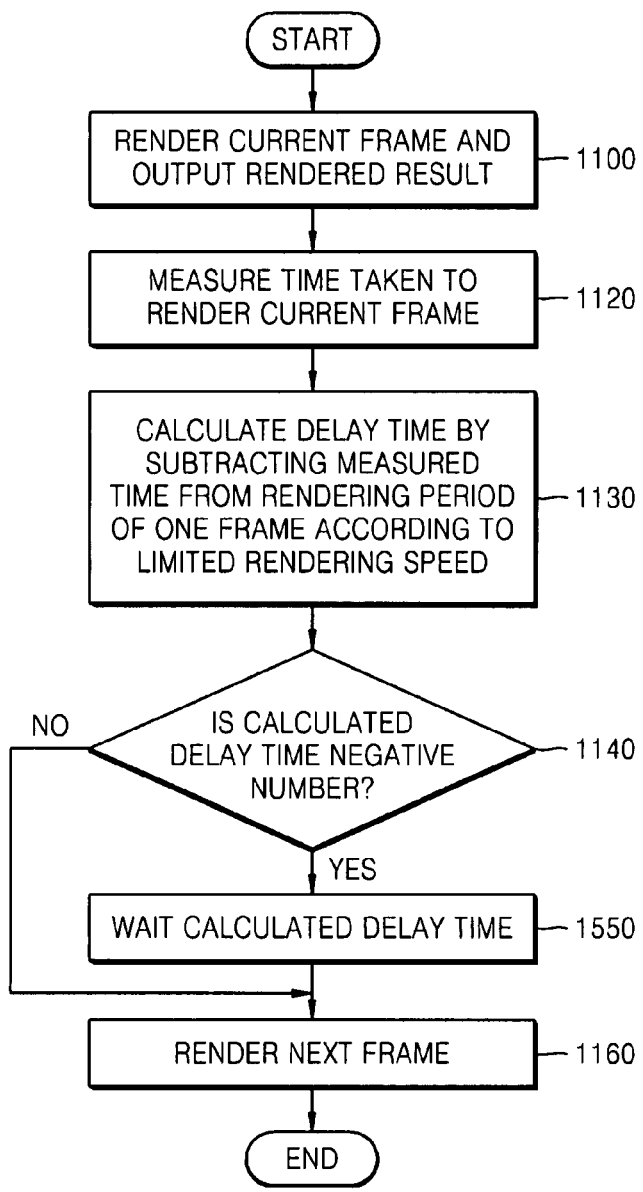
FIG. 10 is a flowchart illustrating a rendering method used by a rendering unit and a delay time calculation unit, according to an embodiment of the present invention.

FIG. 10 is a flowchart illustrating operations of the rendering unit 350 and the delay time calculation unit 390 according to an embodiment of the present invention.

In operation 1100, the rendering engine 300 may render a current frame and output the rendered result.

In operation 1120, the rendering engine 300 may measure the time taken to render the current frame.

In operation 1130, the rendering engine 300 may calculate a delay time, which is the difference between the rendering time and period allocated to a frame, according to a limited rendering speed and the measured time.

The limited rendering speed generally denotes the speed for limiting the number of frames rendered by the rendering unit 350 over a predetermined period of time in order to reduce power consumed by the rendering engine 300. If the limited rendering speed is set, the rendering time or period given to a frame may be determined according to the set limited rendering speed. For example, if the rendering unit 350 limits the maximum rendering speed of 3D graphic data to 30 fps so that more than 30 frames are not rendered per second, the rendering period, i.e., the maximum time T_max, given to a frame may be 1/30 seconds, i.e., 33.3 ms.

In operation 1140, the rendering engine 300 may determine whether the calculated delay time is a negative number.

If the calculated delay time is not a negative number, operation 1150 may be performed. If the calculated delay time is a negative number, operation 1160 may be performed.

In operation 1150, the rendering engine 300 may wait the calculated delay time.

In operation 1160, the rendering engine 300 may render a next frame.

As described above, the method and apparatus for rendering 3D graphic data according to the present invention may render input 3D graphic data according to an output transmission rate which is set in consideration of the type of input 3D graphic data or specifications of a system rendering the input 3D graphic data. Therefore, unnecessary renderings, which barely contribute to the image improvement of image quality, may be prevented, thereby reducing power consumption.

A method and apparatus for rendering 3D graphic data according to the present invention may eliminate at least one of a plurality of processes for rendering 3D graphic data by considering the rendering environment of the 3D graphic data, generating a rendering function including the remaining processes, and rendering the 3D graphic data using the generated rendering function. Therefore, power consumed in rendering the 3D graphic data may be reduced according to the rendering environment of the 3D graphic data, while minimizing the deterioration of image quality.

In addition, the method and apparatus may limit a rendering speed in consideration of the type of 3D graphic data or the processing capacity of a rendering system and may render the 3D graphic data according to the limited rendering speed. Hence, an unnecessary power loss caused by an increase in the rendering speed, which does not help improve image quality, may be prevented.

In addition to the above described embodiments, embodiments of the present invention may also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code may be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of rendering three-dimensional (3D) graphic data comprising:
   eliminating at least one of a plurality of processes for rendering the three-dimensional (3D) graphic data in consideration of a rendering environment of the 3D graphic data;
   generating a rendering function which performs the remaining processes after the at least one process is eliminated; and
   rendering by way of a processro the 3D graphic data using the generated rendering function,
   wherein the eliminating of the at least one of the processes comprises sequentially eliminating at least one rendering option of a plurality of rendering options in order of the rendering options related to effect on image quality represented by the 3D graphic data in consideration of the rendering environment of the 3D graphic data, each of the plurality of rendering options rendering the 3D graphic data using a different rendering technique,
   wherein the at least one rendering option is sequentially eliminated by a number of the rendering options corresponding to a value representing the rendering environment of the 3D graphic data, in order from a rendering option having a least effect on the image quality to another rendering option having a most effect on the image quality.

2. The method of claim 1, wherein the rendering environment comprises a state of power of a system rendering the 3D graphic data.

3. The method of claim 2, wherein the eliminating of the at least one of the processes comprises:
   analyzing the state of power of the system;
   designating at least one of the processes based on the analyzed state of power of the system and with reference to a corresponding relationship between a plurality of power states and the processes, respectively; and
   eliminating the designated at least one of the processes.

4. The method of claim 3, wherein, if the current state of power of the system is represented by the remaining power of the system, which can be currently used, the corresponding relationship is established between the states of power listed in order of the highest to lowest remaining power and the processes listed in order of least to most effect on the image quality, which is represented by the 3D graphic data, respectively.

5. The method of claim 1, wherein the rendering environment comprises at least one of a current distance between an object, represented by the 3D graphic data, and a camera and a current area occupied by the object on a screen.

6. The method of claim 5, wherein the eliminating of the at least one of the processes comprises:
   analyzing at least one of the current distance and the current area;
   designating at least one of the processes based on a value calculated using the analysis result and with reference to the corresponding relationship between a plurality of values, which are determined according to at least one of the current distance and the current area, and the processes, respectively; and
   eliminating the designated at least one of the processes.

7. The method of claim 6, wherein the value is increased as the distance decreases or the area increases, and the corresponding relationship established between the values listed from highest to lowest and the processes listed in order of least to most effect on the image quality, which is represented by the 3D graphic data, respectively.

8. The method of claim 1, further comprising:
   analyzing characteristics of the 3D graphic data; and
   selecting the processes with reference to the analyzed characteristics of the 3D graphic data,
   wherein the eliminating of the at least one of the processes comprises eliminating the at least one of the selected processes in consideration of the rendering environment.

9. The method of claim 1, wherein the generating of the rendering function comprises:
   extracting one or more code blocks corresponding to predetermined functions for rendering the 3D graphic data, which are performed in the remaining processes; and
   generating the rendering function by combining the extracted code blocks.

10. The method of claim 1, wherein, in the rendering of the 3D graphic data, no more than a predetermined number of frames of the 3D graphic data are rendered over a predetermined period of time.

11. The method of claim 10, wherein the rendering of the 3D graphic data comprises:
    measuring time taken to render a current frame;
    calculating a delay time which is a difference between a rendering time of a frame, determined based on the predetermined period of time and the predetermined number of frames, and the measured time; and
    rendering a next frame if the calculated delay time is a negative number and waiting the calculated delay time and then rendering the next frame if the calculated delay time is not the negative number.

12. At least one non-transitory medium comprising computer readable code to control at least one processing element to implement the method of any one of claims 1 though 11.

13. An apparatus rendering three-dimensional (3D) graphic data comprising:
    a processor to control one or more processor executable units a setting unit eliminating at least one of a plurality of processes for rendering 3D graphic data in consideration of a rendering environment of the 3D graphic data;
    a function generation unit generating a rendering function which performs the remaining processes after the at least one process is eliminated; and
    a rendering unit rendering the 3D graphic data using the generated rendering function
    wherein the setting unit sequentially eliminates at least one rendering option of a plurality of rendering options in order of the rendering options related to effect on image quality represented by the 3D graphic data in consideration of the rendering environment of the 3D graphic data, each of the plurality of rendering options rendering the 3D graphic data using a different rendering technique
    wherein the at least one rendering option is sequentially eliminated by a number of the rendering options corresponding to a value representing the rendering environment of the 3D graphic data, in order from a rendering option having a least effect on the image quality to another rendering option having a most effect on the image quality.

14. The apparatus of claim 13, wherein the setting unit comprises:

a rendering environment analysis unit analyzing the rendering environment of the 3D graphic data;

a designation unit designating at least one of the processes based on a state of the analyzed rendering environment of the 3D graphic data and with reference to a corresponding relationship between a plurality of states of the rendering environment and the processes, respectively; and eliminating the designated at least one of the processes.

15. The apparatus of claim 13, wherein the rendering environment comprises a state of power of a system rendering the 3D graphic data.

16. The apparatus of claim 13, wherein the rendering environment comprises at least one of a current distance between an object, represented by the 3D graphic data, and a camera and a current area occupied by the object on a screen.

17. The apparatus of claim 13, further comprising a data analysis unit analyzing characteristics of the 3D graphic data and selecting the processes with reference to the analyzed characteristics of the 3D graphic data.

18. The apparatus of claim 13, wherein the rendering unit renders no more than a predetermined number of frames of the 3D graphic data over a predetermined period of time.

19. The apparatus of claim 13, wherein the setting unit eliminates at least one of a plurality of processes in order of least to most effect on the image quality of the 3D graphics.

* * * * *

UNITED STATES PATENT AND TRADEMARK OFFICE
CERTIFICATE OF CORRECTION

PATENT NO. : 8,379,013 B2  
APPLICATION NO. : 11/892427  
DATED : February 19, 2013  
INVENTOR(S) : Sang-oak Woo et al.

Page 1 of 1

It is certified that error appears in the above-identified patent and that said Letters Patent is hereby corrected as shown below:

In the Claims:

Column 23, Line 24, In Claim 1, delete "rendering by way of a processro" and insert -- rendering, by way of a processor --, therefor.

Column 24, Line 46, In Claim 12, delete "claims 1 though 11." and insert -- claims 1 through 11. --, therefor.

Column 24, Line 49, In Claim 13, delete "processor executable" and insert -- processor-executable --, therefor.

Signed and Sealed this  
Twenty-eighth Day of May, 2013

Teresa Stanek Rea  
*Acting Director of the United States Patent and Trademark Office*